(12) United States Patent
Wang et al.

(10) Patent No.: US 12,451,691 B1
(45) Date of Patent: Oct. 21, 2025

(54) METHOD AND SYSTEM FOR SENSITIVE EQUIPMENT VOLTAGE SAG CONTROL BASED ON FLEXIBLE MULTIPLEXING OF ENERGY STORAGE SYSTEM

(71) Applicant: SICHUAN UNIVERSITY, Sichuan (CN)

(72) Inventors: Ying Wang, Chengdu (CN); Shuyuan Zhang, Chengdu (CN); Xianyong Xiao, Chengdu (CN); Shiru Jia, Chengdu (CN); Xinyue Wang, Chengdu (CN); Xuqing Tang, Chengdu (CN); Xiaoyang Ma, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 19/212,530

(22) Filed: May 19, 2025

(30) Foreign Application Priority Data

Feb. 13, 2025 (CN) .......................... 202510159010.8

(51) Int. Cl.
*H02J 3/00* (2006.01)
*H02J 3/32* (2006.01)
(Continued)

(52) U.S. Cl.
CPC ........ *H02J 3/00125* (2020.01); *H02J 3/0012* (2020.01); *H02J 3/32* (2013.01);
(Continued)

(58) Field of Classification Search
CPC ............. H02J 3/00125; H02J 7/007182; H02J 3/0012; H02J 7/00714; H02J 7/342;
(Continued)

(56) References Cited

U.S. PATENT DOCUMENTS

2022/0416543 A1  12/2022  Wang et al.
2024/0305096 A1*  9/2024  Zhang ..................... H02J 3/381

FOREIGN PATENT DOCUMENTS

CN  108828301 A  11/2018
CN  116706923 A  9/2023

OTHER PUBLICATIONS

Notification to Grant Patent Right for Invention in Chinese Application No. 202510159010.8 mailed on Mar. 21, 2025, 6 pages.
(Continued)

*Primary Examiner* — Carlos Amaya
(74) *Attorney, Agent, or Firm* — PORUS IP LLC

(57) ABSTRACT

Disclosed is a method and system for SE voltage sag control based on flexible multiplexing of an energy storage system. The present disclosure achieves controlling of an early stage of the voltage sag using a supercapacitor, and continuous controlling of a late stage of the voltage sag using the energy storage system; achieves real-time accurate detection of the voltage sag on a grid side and a load side; achieves optimal energy compensation through flexible switching in an input stage and an output stage to prevent SE from tripping due to a phase jump caused by the optimal energy compensation; on a DC/DC side, performs power frequency division control based on a difference in response features between the supercapacitor and the lithium battery energy storage system; on a DC/AC side, provides a composite control system including a voltage feedforward loop, a voltage feedback outer loop, and a current feedback inner loop.

14 Claims, 11 Drawing Sheets

(51) Int. Cl.
*H02J 7/00* (2006.01)
*H02J 7/34* (2006.01)

(52) U.S. Cl.
CPC .... *H02J 7/00714* (2020.01); *H02J 7/007182* (2020.01); *H02J 7/342* (2020.01); *H02J 7/345* (2013.01); *H02J 3/003* (2020.01); *H02J 2203/10* (2020.01); *H02J 2203/20* (2020.01); *H02J 2207/50* (2020.01)

(58) Field of Classification Search
CPC .... H02J 3/32; H02J 7/345; H02J 3/003; H02J 2203/20; H02J 2207/50; H02J 2203/10
See application file for complete search history.

(56) References Cited

OTHER PUBLICATIONS

Lyu, Ruihong et al., Research on crack identification algorithm of anti-corrosion layer of air coupling ultrasonic pipeline, Chinese Journal of Scientific Instrument, 45(12): 234-245, 2024.

Xu, Fangwei et al., Evaluation of Fault Level of Sensitive Equipment Caused by Voltage Sag via Data Mining, IEEE Transactions on Power Delivery, 2021, 9 pages.

\* cited by examiner

100

110

Constructing a topological structure for a hybrid energy storage system to control a voltage sag, the hybrid energy storage system including a lithium battery energy storage system and a supercapacitor, controlling of an early stage of the voltage sag being achieved by the supercapacitor, and continuous controlling of a late stage of the voltage sag being achieved by the lithium battery energy storage system

120

Achieving real-time and accurate detection of the voltage sag on a grid side and a load side by adopting an improved variational mode decomposition detection approach based on a Teager-Kaiser energy operator and a kurtosis coefficient

130

Achieving optimal energy compensation through flexible switching in an input stage and an output stage adopting a flexible optimal energy compensation strategy to prevent SE from tripping due to a phase jump caused by the optimal energy compensation

140

On a DC/DC side, coordinating power output through power frequency division control according to a difference in response features between the supercapacitor and the lithium battery energy storage system; on a DC/AC side, performing composite control through a voltage feedforward loop, a voltage feedback outer loop, and a current feedback inner loop, and eliminating a secondary effect of harmonics on the SE using a proportional integral quasi-resonance controller.

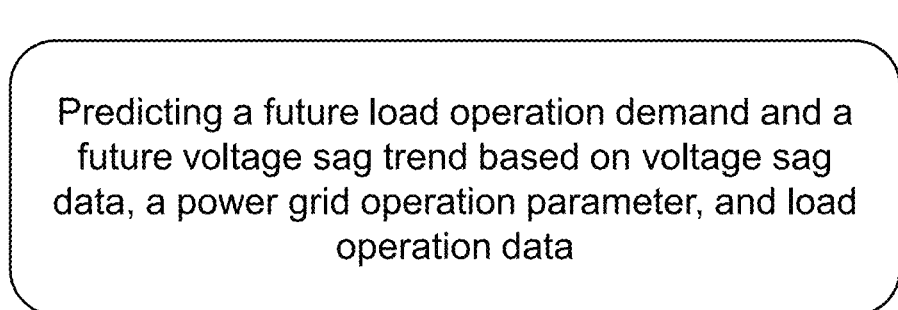

Predicting a future load operation demand and a future voltage sag trend based on voltage sag data, a power grid operation parameter, and load operation data

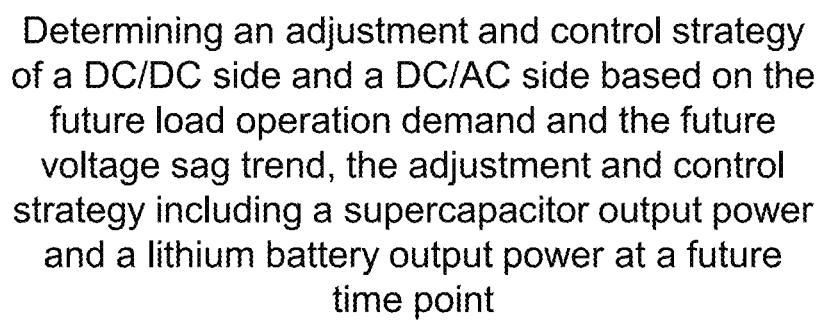

Determining an adjustment and control strategy of a DC/DC side and a DC/AC side based on the future load operation demand and the future voltage sag trend, the adjustment and control strategy including a supercapacitor output power and a lithium battery output power at a future time point

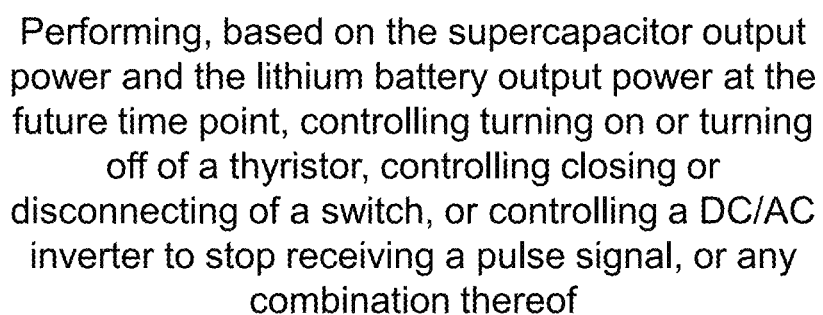

Performing, based on the supercapacitor output power and the lithium battery output power at the future time point, controlling turning on or turning off of a thyristor, controlling closing or disconnecting of a switch, or controlling a DC/AC inverter to stop receiving a pulse signal, or any combination thereof

FIG. 12

METHOD AND SYSTEM FOR SENSITIVE EQUIPMENT VOLTAGE SAG CONTROL BASED ON FLEXIBLE MULTIPLEXING OF ENERGY STORAGE SYSTEM

CROSS-REFERENCE TO RELATED APPLICATIONS

This application claims priority to Chinese Patent Application No. 202510159010.8, filed on Feb. 13, 2025, the entire contents of which are hereby incorporated by reference.

TECHNICAL FIELD

The present disclosure relates to the field of energy storage technology and voltage sag control technology, and in particular, to a method and system for sensitive equipment (SE) voltage sag control based on flexible multiplexing of an energy storage system.

BACKGROUND

Industrial parks, as critical carriers for the scale and clustering of modern manufacturing, provide essential support for advancing high-end technology industries. With the development and application of energy storage technologies, industrial parks widely adopt an energy storage system to achieve peak-valley arbitrage, thereby reducing electricity costs. However, modern industrial parks are equipped with a significant number of electronic devices sensitive to power quality. Voltage sags may cause trip or production disruption to these devices, leading to substantial economic losses. When the energy storage system discharges, the industrial parks operate in an islanded mode, powered independently by the energy storage system, during which the risk of voltage sags is relatively low. However, in charging or standby modes, the industrial parks rely on a grid power, making it highly susceptible to voltage sags in the event of grid failure. In addition, harmonic interference accompanying voltage sags causes a secondary effect to the SE. Statistics indicate that the energy storage system remains idle for up to 12 hours per day. If flexible multiplexing SE voltage sag control can be provided, the resource utilization efficiency will be significantly improved.

Currently, the energy storage system only supports peak-valley arbitrage and cannot realize voltage sag control. Deploying dedicated devices for voltage sag control incurs prohibitively high costs. Moreover, the energy storage system remains idle for extended periods, leading to significant resource underutilization. The energy storage system is typically based on lithium batteries, which exhibit long response time. Even if connected in series with the SE, they remain incapable of voltage sag control. If industrial parks install additional devices for voltage sag control, sensitive end-users may face substantially increased investment costs.

Current voltage sag detection methods are prone to noise interference, exhibiting insufficient accuracy and delayed response. Conventional algorithms calculate the root mean square (RMS) values of voltage across two adjacent windows, then use an absolute differential value as an RMS difference index to determine sag initiation/termination times. However, the window calculation inherently suffers from a transitional effect that causes a loss of instantaneous amplitude and phase information, resulting in a detection error in a voltage sag detection result. Hybrid detection methods combining dq transform with morphological filtering to construct a composite filter for detecting voltage sag features are vulnerable to harmonic interference and noise in a distribution network, leading to false detection. Although the digital prolate spheroidal window corrects a 2D complex matrix from S-transform for voltage sag detection, the detection efficiency is compromised by the cumbersome correction process.

Conventional compensation strategies either exhibit excessive energy consumption or induce phase jump that trigger equipment shutdown. For traditional in-phase or full-voltage sag compensation strategies: the requirement to output high active power leads to prohibitive energy consumption, which needs large-capacity supercapacitors. For minimum energy compensation strategies, the phase of the compensation voltage is adjusted to remain perpendicular to the load current, thereby minimizing active power output. However, the input/output of minimum energy compensation introduces phase jump in the load voltage, causing undesired tripping of the SE.

The current systems face critical control limitations: they fail to effectively coordinate the response difference between the lithium batteries and the supercapacitors, while exhibiting insufficient dynamic performance in control loops to rapidly mitigate the voltage sags and harmonics. On the DC/DC side, the significant difference in the response speeds of the lithium batteries and the supercapacitors creates coordination challenges for their power output. On the DC/AC side, conventional voltage feedback loops demonstrate inadequate fast response and poor disturbance rejection, resulting in unsatisfactory voltage sag control when the voltage sags occur. Furthermore, the voltage sags are frequently accompanied by harmonic distortion, which causes the secondary effect on the SE, and needs to be addressed.

Therefore, it is desirable to provide a method and system for SE voltage sag control based on flexible multiplexing of an energy storage system, which can realize economic and reliable operation while ensuring power quality.

SUMMARY

Aiming at the above problem, the embodiments of the present disclosure provide a method and system for SE voltage sag control based on flexible multiplexing of an energy storage system, which achieves flexible multiplexing compared with an energy storage system used for peak-valley arbitrage in traditional industrial parks, and can prevent the SE from tripping and causing significant industrial losses, so as to provide important support for high-quality power supply of the industrial parks.

One of the embodiments of the present disclosure provides a method for SE voltage sag control based on flexible multiplexing of an energy storage system. The method may comprise: constructing a topological structure for a hybrid energy storage system to control a voltage sag, wherein the hybrid energy storage system includes a lithium battery energy storage system and a supercapacitor, controlling of an early stage of the voltage sag is achieved by the supercapacitor, and continuous controlling of a late stage of the voltage sag is achieved by the lithium battery energy storage system; achieving real-time and accurate detection of the voltage sag on a grid side and a load side by adopting an improved variational mode decomposition detection approach based on a Teager-Kaiser energy operator and a kurtosis coefficient; achieving optimal energy compensation through flexible switching in an input stage and an output stage adopting a flexible optimal energy compensation strategy to prevent SE from tripping due to a phase jump caused by the optimal energy compensation; on a DC/DC side, coordinating power output through power frequency division control according to a difference in response features between the supercapacitor and the lithium battery energy storage system; on a DC/AC side, performing composite control through a voltage feedforward loop, a voltage feedback outer loop, and a current feedback inner loop, and eliminating a secondary effect of harmonics on the SE using a proportional integral quasi-resonant controller.

One of the embodiments of the present disclosure further provides a system for SE voltage sag control based on flexible multiplexing of an energy storage system. The system may comprise: a topological structure for a hybrid energy storage system to control a voltage sag, wherein the hybrid energy storage system includes a lithium battery energy storage system and a supercapacitor, controlling of an early stage of the voltage sag is achieved by the supercapacitor, and continuous controlling of a late stage of the voltage sag is achieved by the lithium battery energy storage system; a detection unit configured to achieve real-time and accurate detection of the voltage sag on a grid side and a load side by adopting an improved variational mode decomposition detection approach based on a Teager-Kaiser energy operator and a kurtosis coefficient; a compensation unit configured to achieve optimal energy compensation through flexible switching in an input stage and an output stage adopting a flexible optimal energy compensation strategy to prevent SE from tripping due to a phase jump caused by the optimal energy compensation; a control system configured to: on a DC/DC side, coordinate power output through power frequency division control according to a difference in response features between the supercapacitor and the lithium battery energy storage system; on a DC/AC side, perform composite control through a voltage feedforward loop, a voltage feedback outer loop, and a current feedback inner loop, and eliminate a secondary effect of harmonics on the SE using a proportional integral quasi-resonant controller.

The embodiments of the present disclosure include but are not limited to the following beneficial effects.

In the aspect of the topological structure, the embodiments of the present disclosure provide the hybrid energy storage system combining the lithium battery energy storage system and the supercapacitor, rapid controlling of the early stage of the voltage sag is achieved based on the feature of extremely fast response speed of the supercapacitor, and continuous controlling of the late stage of the voltage sag is achieved based on the feature of significant energy reserve of the lithium battery energy storage system. In the aspect of the detection algorithm, the embodiments of the present disclosure provide the improved variational mode decomposition detection approach based on the Teager-Kaiser energy operator and the kurtosis coefficient, thereby achieving real-time and accurate detection of the voltage sag on the grid side and the load side. In the aspect of the compensation strategy, the embodiments of the present disclosure provide the flexible optimal energy compensation strategy, achieving the optimal energy compensation through flexible switching in the input stage and the output stage to prevent the SE from tripping due to the phase jump caused by the optimal energy compensation. In the aspect of the control system, the embodiments of the present disclosure provide the power frequency division control system to coordinate the power output according to the difference in the response features between the supercapacitor and the lithium battery energy storage system on the DC/DC side; and provide the composite control system including the voltage feedforward loop, the voltage feedback outer loop, and the current feedback inner loop, on the DC/AC side, thereby improving the fast response capacity and disturbance rejection stability of the control system, and eliminating the secondary effect of harmonics on the SE using the proportional integral quasi-resonance (PIQR) controller.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein:

FIG. 1 is a flowchart illustrating an exemplary method for SE voltage sag control based on flexible multiplexing of an energy storage system according to some embodiments of the present disclosure;

FIG. 12 is a flowchart illustrating an exemplary process of controlling an operation mode according to some embodiments of the present disclosure.

DETAILED DESCRIPTION

Figure 2:
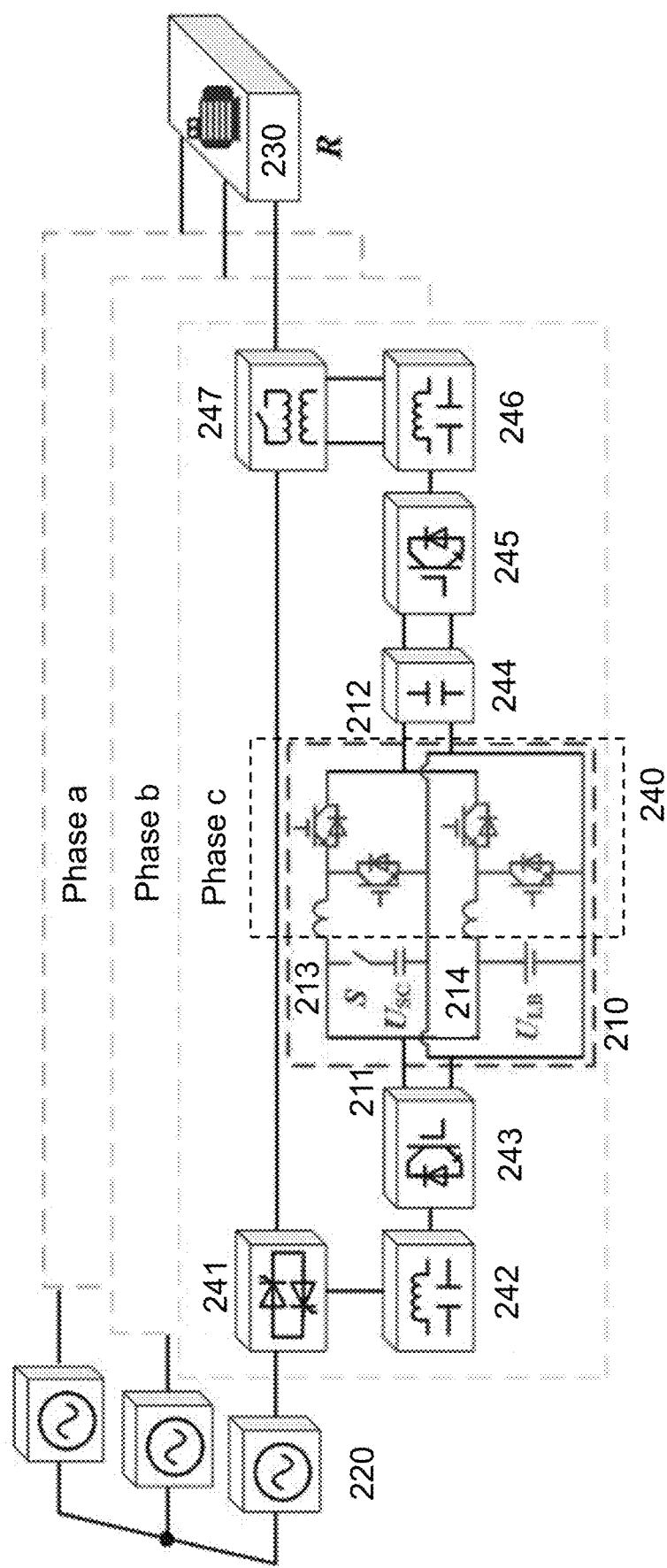
FIG. 2 is a schematic diagram illustrating an exemplary topological structure for a hybrid energy storage system to control a voltage sag according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a flowchart illustrating an exemplary method for SE voltage sag control based on flexible multiplexing of an energy storage system according to some embodiments of the present disclosure.

The embodiments of the present disclosure provide a method for SE voltage sag control based on flexible multiplexing of an energy storage system, which may be implemented by a system for SE voltage sag control based on flexible multiplexing of an energy storage system to realize the SE voltage sag control based on flexible multiplexing of the energy storage system.

One of the embodiments of the present disclosure provides the system for the SE voltage sag control based on flexible multiplexing of the energy storage system. The system may comprise: a topological structure for a hybrid energy storage system (HESS) to control a voltage sag, wherein the hybrid energy storage system includes a lithium battery energy storage system and a supercapacitor, controlling of an early stage of the voltage sag is achieved by the supercapacitor, and continuous controlling of a late stage of the voltage sag is achieved by the lithium battery energy storage system; a detection unit configured to achieve real-time and accurate detection of the voltage sag on a grid side and a load side by adopting an improved variational mode decomposition detection approach based on a Teager-Kaiser energy operator and a kurtosis coefficient; a compensation unit configured to achieve optimal energy compensation through flexible switching in an input stage and an output stage adopting a flexible optimal energy compensation strategy to prevent SE from tripping due to a phase jump caused by the optimal energy compensation; a control system configured to: on a DC/DC side, coordinate power output through power frequency division control according to a difference in response features between the supercapacitor and the lithium battery energy storage system; on a DC/AC side, perform composite control through a voltage feedforward loop, a voltage feedback outer loop, and a current feedback inner loop, and eliminate a secondary effect of harmonics on the SE using a proportional integral quasi-resonance controller (PIQR).

The detection unit, the compensation unit, and the control system may be implemented by a processor. The processor may be configured to process data and/or information obtained from other devices/components or parts. The processor may execute program instructions based on the data, information, and/or processing results to perform one or more of the functions described in the embodiments of the present disclosure. Merely by way of example, the processor may include, but is not limited to, a central processing unit (CPU), a microprocessor MCU, or the like, or any combination thereof. In some embodiments, the processor may include a plurality of modules, and different modules may be configured to execute separate program instructions.

As shown in FIG. 1, a process 100 may include the following operations:

In 110, constructing a topological structure for a hybrid energy storage system to control a voltage sag, the hybrid energy storage system including a lithium battery energy storage system and a supercapacitor, controlling of an early stage of the voltage sag being achieved by the supercapacitor, and continuous controlling of a late stage of the voltage sag being achieved by the lithium battery energy storage system. In some embodiments, the operation 110 may be performed by the processor.

The hybrid energy storage system (HESS) refers to a system used for energy storage and containing a plurality of components (e.g., the supercapacitor and the lithium battery energy storage system).

The SE refers to critical equipment that is highly sensitive to power quality (e.g., a voltage fluctuation, a frequency deviation, harmonics, etc.), which may result in a false operation, performance degradation, or damage. For example, the SE may include industrial automation equipment, semiconductor manufacturing equipment, a data center, IT equipment, medical equipment, etc.

The topological structure refers to a design of a connection between the components (e.g., the lithium battery energy storage system, the supercapacitor, etc.) of the HESS and operation modes thereof.

FIG. 2 is a schematic diagram illustrating an exemplary topological structure for a hybrid energy storage system to control a voltage sag according to some embodiments of the present disclosure. In some embodiments, as shown in FIG. 2, a front end 211 of the hybrid energy storage system 210 is connected in parallel with a power grid 220 for peak-valley arbitrage, and a rear end 212 of the hybrid energy storage system 210 is connected in series with a load 230 (e.g., the SE) for the voltage sag control. The hybrid energy storage system 210 is composed of a supercapacitor 213 and a lithium battery energy storage system 214 for the peak-valley arbitrage, and is connected to a same DC bus 244 through a DC/DC boosted circuit 240. The front end 211 of the hybrid energy storage system 210 is connected to the power grid 220 through a thyristor 241, an LC filter 242, and a DC/AC converter 243, and the rear end 212 of the hybrid energy storage system 210 is connected to the load 230 through the DC bus 244, a DC/AC inverter 245, an LC filter 246, and a transformer 247.

In some embodiments, as shown in FIG. 2, the topological structure may be constructed based on the HESS by connecting the lithium battery and the supercapacitor in parallel to the DC bus, and connecting the front end to the power grid to achieve peak-valley arbitrage, connecting the rear end in series with the SE to inject a dynamic compensation voltage. The front end refers to the grid side of the HESS, i.e., a portion that is connected to the power grid. The rear end refers to the load side of the HESS, i.e., a portion that is connected to the SE.

In some embodiments, the HESS may include the lithium battery; the supercapacitor may be connected in series with a switch S and then connected in parallel with the lithium battery; the HESS may be connected in parallel with the power grid to achieve peak-valley arbitrage, and connected to the power grid via the DC/AC converter, the LC filter, and the thyristor in sequence; and the HESS may be connected in series with the SE for the voltage sag control, and connected to a load R via the DC bus, the DC/AC inverter, the LC filter, and the transformer in sequence by coupling.

In some embodiments, the topological structure may include four operation modes: a first mode, a second mode, a third mode, and a fourth mode.

Figure 3A:
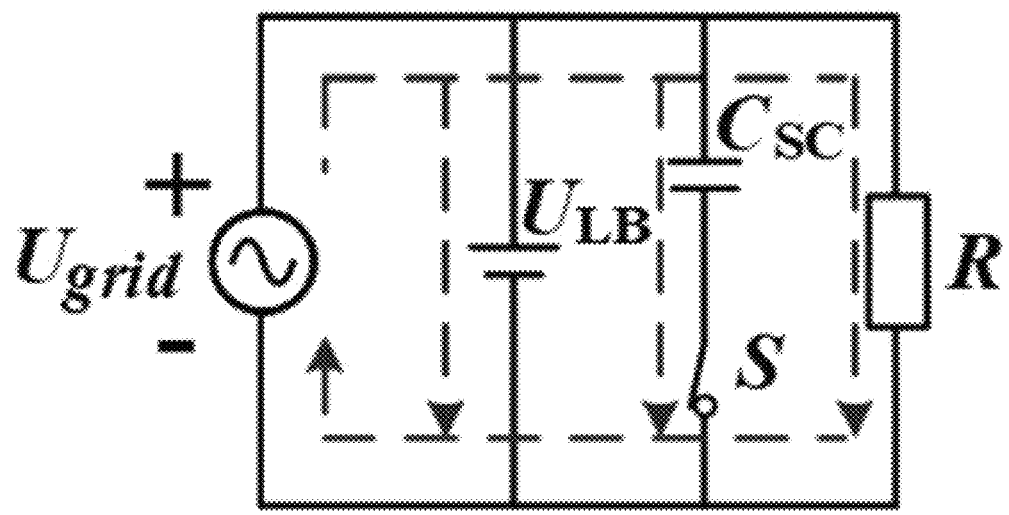
FIG. 3A is a schematic diagram illustrating an exemplary peak-valley arbitrage charging mode of a first mode according to some embodiments of the present disclosure.
Figure 3B:
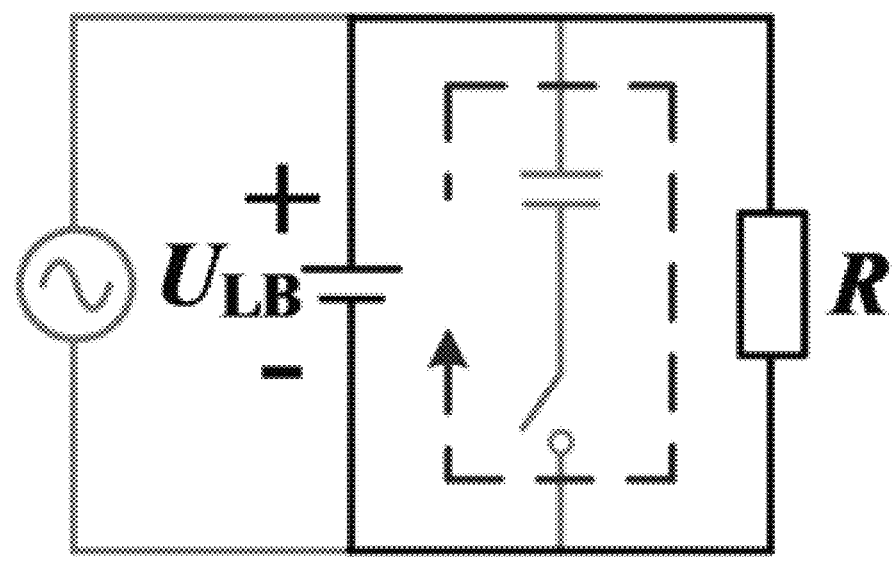
FIG. 3B is a schematic diagram illustrating an exemplary peak-valley arbitrage discharging mode of a second mode according to some embodiments of the present disclosure.
Figure 3C:
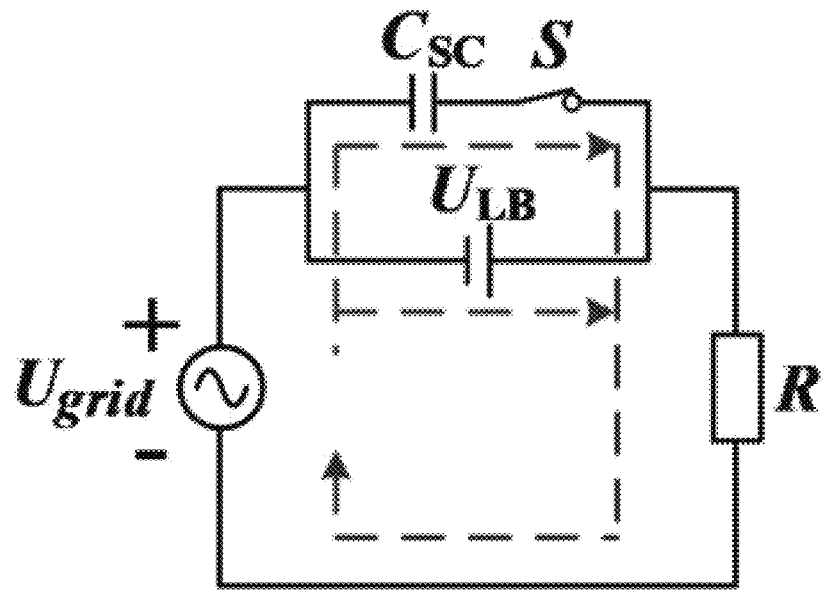
FIG. 3C is a schematic diagram illustrating an exemplary early stage mode of voltage sag control of a third mode according to some embodiments of the present disclosure.
Figure 3D:
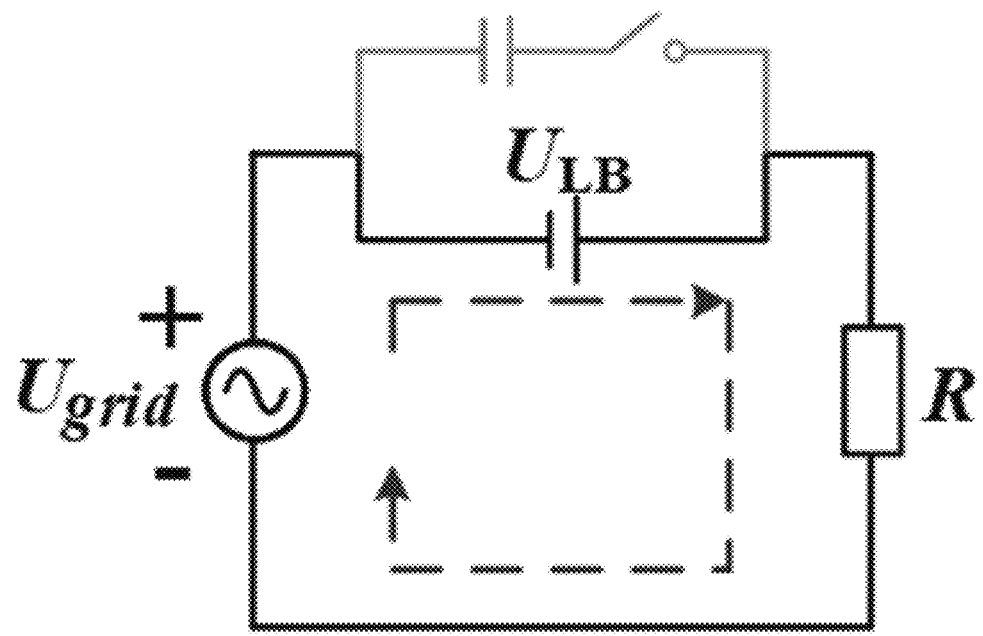
FIG. 3D is a schematic diagram illustrating an exemplary late stage mode of voltage sag control of a fourth mode according to some embodiments of the present disclosure.

FIG. 3A is a schematic diagram illustrating an exemplary peak-valley arbitrage charging mode of a first mode according to some embodiments of the present disclosure. FIG. 3B is a schematic diagram illustrating an exemplary peak-valley arbitrage discharging mode of a second mode according to some embodiments of the present disclosure. FIG. 3C is a schematic diagram illustrating an exemplary early stage mode of voltage sag control of a third mode according to some embodiments of the present disclosure. FIG. 3D is a schematic diagram illustrating an exemplary late stage mode of voltage sag control of a fourth mode according to some embodiments of the present disclosure.

Figure 4:
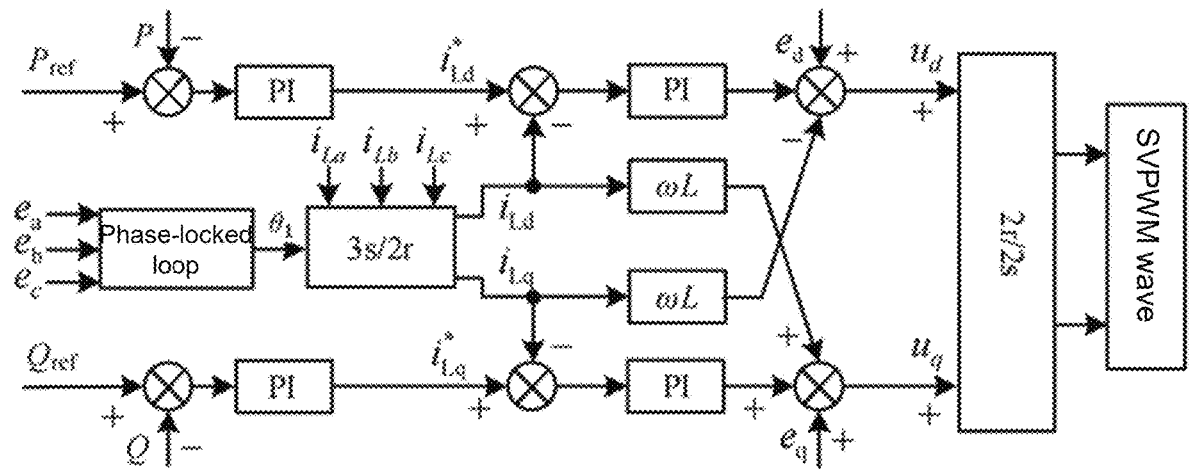
FIG. 4 is a schematic diagram illustrating an exemplary PQ control strategy for grid-connected operation according to some embodiments of the present disclosure.

The first mode is the peak-valley arbitrage charging mode: during a period of low electricity price, the thyristor is turned on and the switch S is closed, the load R is in a grid-connected operation state, and a grid voltage $U_{grid}$ supplies power to the load R; the lithium battery and the supercapacitor are charged by the power grid using grid-connected constant power control (i.e., active power P and reactive power Q control, PQ control), as shown in FIG. 4. FIG. 4 is a schematic diagram illustrating an exemplary PQ control strategy for grid-connected operation according to some embodiments of the present disclosure. When charging is completed, the grid-connected constant power control stops outputting a pulse signal to the DC/AC inverter, and the HESS is in a standby state with full power.

The grid-connected operation state is an operation state in which the load is directly connected to the public power grid and operates synchronously. The peak-valley arbitrage refers to an operating mode that leverages the difference between peak and off-peak electricity prices in the power grid by charging for energy storage during a low price (valley) period and discharging to supply power during a high price (peak) period, thereby achieving economic benefits through buying low and selling high.

In some embodiments, the grid-connected constant power control includes: obtaining grid side voltage instantaneous values $e_a$, $e_b$, and $e_c$ by voltage sampling, obtaining a voltage phase $\theta_1$ through a phase-locked loop, and obtaining grid side voltage instantaneous values $e_d$ and $e_q$ in a dq coordinate system through an abc/dq transformation; obtaining three-phase inductor current instantaneous values $i_{La}$, $i_{Lb}$ and $i_{Lc}$ by current sampling, obtaining inductor current instantaneous values $i_{Ld}$ and $i_{Lq}$ in the dq coordinate system through the abc/dq transformation; comparing inductor current reference values $i_{Lq}^*$ and $i_{Ld}^*$ in the dq coordinate system obtained after power outer loop PI controller operation with the inductor current instantaneous values $i_{Ld}$ and $i_{Lq}$ in the dq coordinate system, an error value obtained from the comparison being processed by the PI controller operation to obtain an output value, and the output value being added to/subtracted from a feedforward quantity and a decoupling term to obtain output voltage values $u_d$ and $u_q$ in the dq coordinate system, obtaining a voltage component in an $\alpha\beta$ coordinate system through a dq/$\alpha\beta$ coordinate transformation, generating a space vector pulse width modulation wave, and then generating 12 pulse width modulation wave drive signals to achieve the grid-connected constant power control.

The output value being added to/subtracted from a feedforward quantity and a decoupling term includes: subtracting a d-axis component of the output value from the feedforward quantity and adding the d-axis component of the output value to the decoupling term, and adding a q-component of the output value to the feedforward quantity and the decoupling term.

In some embodiments of the present disclosure, the 12 pulse width modulation wave drive signals are generated based on the collected grid side voltage instantaneous values $e_a$, $e_b$ and $e_c$, and the three-phase inductor current instantaneous values $i_{La}$, $i_{Lb}$ and $i_{Lc}$ by the process described above, thereby achieving the grid-connected constant power control.

Figure 5:
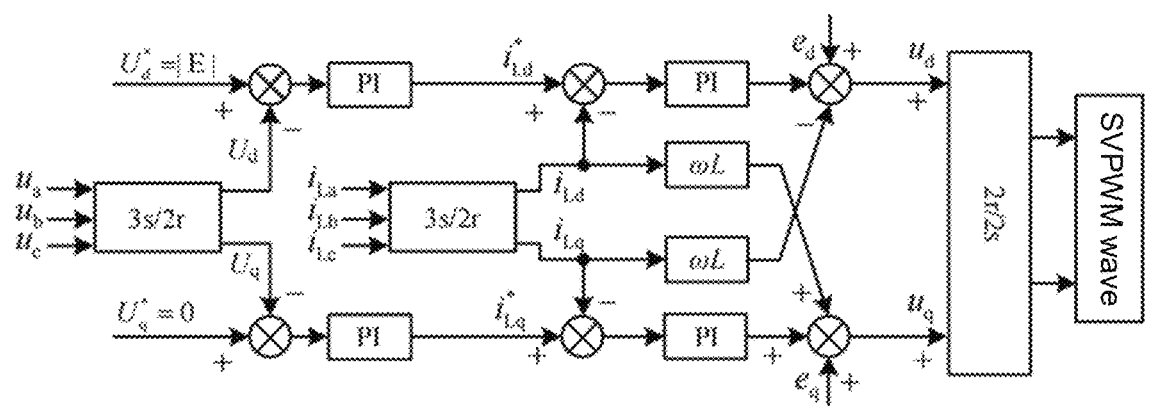
FIG. 5 is a schematic diagram illustrating an exemplary VF control strategy for islanded operation according to some embodiments of the present disclosure.

The second mode is a peak-valley arbitrage discharge mode: during a period of high electricity price, the thyristor is turned off and the switch S is disconnected, the load R is in an islanded operation state, and the load R is powered by the lithium battery using constant voltage and constant frequency control (i.e., voltage-frequency control, VF control), as shown in FIG. 5. FIG. 5 is a schematic diagram illustrating an exemplary VF control strategy for islanded operation according to some embodiments of the present disclosure. When discharging is completed, the thyristor is turned on, and the load R resumes the grid-connected operation state, i.e., the load R is powered by the power grid; the HESS is in the standby state with surplus power, waiting for the period of low electricity price to start charging.

The islanded operation state refers to an operation state in which a load operates independently from a main power grid.

In some embodiments, the constant voltage and constant frequency control includes: a control target of a voltage outer loop being a load side voltage, obtaining three-phase voltage instantaneous values $u_a$, $u_b$, and $u_c$ in an abc coordinate system by voltage sampling, and then obtaining voltage instantaneous values $U_d$ and $U_q$ in the dq coordinate system through the abc/dq transformation, comparing voltage reference values $U_d^*$ and $U_q^*$ in the dq coordinate system with the voltage instantaneous values $U_d$ and $U_q$, determining inductor current reference values $i_{Ld}^*$ and $i_{Lq}^*$ in the dq coordinate system output by the PI controller operation on an error value obtained by the comparison as reference values of a current inner loop; obtaining three-phase inductor current instantaneous values $i_{La}$, $i_{Lb}$, and $i_{Lc}$ in the abc coordinate system by current sampling, and then obtaining current instantaneous values $i_{Ld}$ and $i_{Lq}$ in the dq coordinate system through the abc/dq transformation, the inductor current reference values $i_{Ld}^*$ and $i_{Lq}^*$ in the dq coordinate system being compared with the inductor current instantaneous values $i_{Ld}$ and $i_{Lq}$ to obtain resulting error values, the error values being processed by the PI controller operation to obtain output values, and the output values being added to/subtracted from a voltage feedforward quantity and a load term to obtain output voltage values $u_d$ and $u_q$, obtaining a voltage component in an $\alpha\beta$ coordinate system through a dq/$\alpha\beta$ coordinate transformation, generating a space vector pulse width modulation wave, and then generating 12 pulse width modulation wave drive signals to achieve the constant voltage and constant frequency control.

In some embodiments of the present disclosure, the 12 pulse width modulation wave drive signals are generated based on the collected three-phase voltage instantaneous values $u_a$, $u_b$, and $u_c$ in the abc coordinate system by the process described above, thereby achieving the constant voltage and constant frequency control.

The third mode is an early stage mode of the voltage sag control: when the voltage sag occurs, the grid voltage and the HESS jointly supply power to the load R; the switch S is closed, and the supercapacitor and the lithium battery supply power simultaneously; the supercapacitor outputs a power exceeding a specific value within a set time threshold to achieve the voltage sag control; and the power of the supercapacitor decreases as an output power of the lithium battery increases.

The fourth mode is a late stage mode of the voltage sag control: as the output power of the lithium battery increases, when the output power of the lithium battery reaches a compensation power required by the load R, the output power of the supercapacitor is 0, the switch S is disconnected, and the load R is powered by the power grid and the lithium battery simultaneously.

A traditional topological structure is provided with the supercapacitor, known as a dynamic voltage restorer (DVR), to control the entire process of the voltage sag, and a typical configuration control duration is in a second range. Because of a high investment cost of the supercapacitor, reducing the configuration capacity of the supercapacitor can lower the investment cost. Accordingly, in the embodiments of the present disclosure, according to the response time of the lithium battery, an improved topological structure configures the supercapacitor to be used only for controlling the early stage of the voltage sag, and the configuration control duration is shortened to a millisecond range, which achieves fast controlling of the early stage of the voltage sag.

In some embodiments, in response to determining that the operation mode of the topological structure is the first mode, the processor may control the thyristor to be turned on and the switch S to be closed, and the grid voltage $U_{grid}$ supplies power to the load R; the the lithium battery is charged by the power grid through the DC/AC converter; in response to determining that remaining power of the lithium battery is full, outputting the pulse signal to the DC/AC inverter is stopped.

In response to determining that the operation mode of the topological structure is the second mode, the processor controls the thyristor to be turned off and the switch S to be disconnected, and controls the load R to be powered by the lithium battery; in response to determining that the remaining power of the lithium battery is below a power threshold, the processor controls the thyristor to be turned on so as to control the power grid to supply power to the load R.

More descriptions regarding controlling the thyristor to be turned on or turned off in the first mode, controlling the switch to be closed or disconnected, or controlling the DC/AC inverter to stop receiving the pulse signal, or any combination thereof, may be found in FIG. 12 and the related descriptions thereof.

In 120, achieving real-time and accurate detection of the voltage sag on a grid side and a load side by adopting an improved variational mode decomposition detection approach based on a Teager-Kaiser energy operator and a kurtosis coefficient. In some embodiments, the operation 120 may be performed by the detection unit.

In some embodiments, the detection unit may enhance a mutation feature of the voltage sag based on the Teager-Kaiser energy operator (TKEO), and filter a key mode component after variational mode decomposition (VMD) based on the kurtosis coefficient (KC) to realize the real-time and accurate detection of the voltage sag on the grid side and the load side through dynamic threshold comparison.

In some embodiments, the operation 120 may be implemented by operations 121-129.

In 121, converting a voltage instantaneous value into an envelope based on the TKEO to enhance a voltage sag feature. An expression of the TKEO is shown in (1):

$$\psi[u(t)]=\dot{u}^2(t)-u(t)\ddot{u}(t)=U^2\omega^2\cos^2(\omega t+\varphi_0)+U^2\omega^2\sin^2(\omega t+\varphi_0)=U^2\omega^2 \quad (1),$$

where $\psi$ represents the TKEO, u(t) represents the voltage instantaneous value, U represents a voltage peak value, $\omega$ represents a frequency, $\varphi_0$ represents an initial phase, $\dot{u}^2(t)$ represents a square of a first derivative of the voltage instantaneous value u(t) and ü(t) represents a second derivative of the voltage instantaneous value u(t).

In 122, establishing a variational constraint model is, an expression of the variational constraint model being (2):

$$\begin{cases} \min_{\{u_k\},\{\omega_k\}} \left\{ \sum_{k=1}^{K} \left\| \partial_t \left[ \left( \delta(t) + \frac{j}{\pi t} \right) \times u_k(t) \right] e^{-j\omega_t t} \right\|_2^2 \right\}, \\ \text{s.t.} \sum_{k=1}^{K} u_k = f(t) \end{cases} \quad (2)$$

where $u_k$ represents a k-th decomposed intrinsic mode function component, $u_k(t)$ represents a k-th decomposed intrinsic mode function component at time t; K represents a count of decomposed modes, $f(t)$ represents a voltage sag signal, $\delta(t)$ represents an impulse function, $\omega_k$ represents a center frequency of a k-th intrinsic mode function component, $\partial_t$ represents gradient operation, s.t. represents a constraint condition, j represents an imaginary unit, and $\omega_t$ represents a phase angle that changes with the time t.

In 123, transforming a constrained variational problem into an unconstrained variational problem by introducing an augmented Lagrangian function L. An expression of the augmented Lagrangian function L is shown in (3):

$$L=(\{u_k\},\{\omega_k\},\{\lambda\})=\alpha_0\sum_{k=1}^{K}\left\|\partial_t\left[\left(\delta(t)+\frac{j}{\pi}\right)\times u_k(t)\right]e^{-j\omega_t t}\right\|_2^2 + \left\|f(t)-\sum_{k=1}^{K}u_k(t)\right\|_2^2 + \left\langle\lambda(t),f(t)-\sum_{k=1}^{K}u_k(t)\right\rangle, \quad (3)$$

where $\alpha_0$ represents a penalty factor, $\lambda$ represents a Lagrangian operator, $<,>$ represents inner product operation, $\lambda(t)$ represents a Lagrangian operator at the time t, $\|.\|_2^2$ represents a 2-norm, and $\partial_t$ represents the gradient operation.

In 124, updating and iterating K intrinsic mode functions and residual components with a fixed bandwidth and a center frequency by using an alternating direction method of multipliers (ADMM). Expressions of update equations and iterative termination conditions of the $\{u_k\}$, $\{\omega_k\}$, and $\lambda$ based on Fourier isometric transform are (4)-(7):

$$\hat{u}_k^{n+1} = \frac{\hat{f}(\omega) - \sum_{i \neq k} \hat{u}_i(\omega) + \frac{\hat{\lambda}(\omega)}{2}}{1 + 2\alpha_0(\omega - \omega_k)^2} \quad (4)$$

$$\hat{\omega}_k^{n+1} = \frac{\int_0^\infty \omega |\hat{u}_i(\omega)|^2 d\omega}{\int_0^\infty |\hat{u}_{i(\omega)}|^2 d\omega} \quad (5)$$

$$\hat{\lambda}^{n+1}(\omega) = \hat{\lambda}^n(\omega) + \tau\left[\hat{f}(\omega) - \sum_{k=1}^K \hat{u}_k^{n+1}(\omega)\right] \quad (6)$$

$$\sum_{k=1}^K \frac{\|\hat{u}_k^{n+1} - \hat{u}_k^n\|_2^2}{\|\hat{u}_k^n\|_2^2} < \varepsilon \quad (7)$$

where $\hat{u}_k^{n+1}$ and $\hat{\omega}_k^{n+1}$ represent Fourier transforms of $u_k^{n+1}$ and $\omega_k^{n+1}$, respectively, $\tau$ represents a noise tolerance, $\varepsilon$ represents a convergence accuracy; $u_k^{n+1}$ and $\omega_k^{n+1}$ represent a k-th decomposed intrinsic function component of an (n+1)-th sample and a center frequency of the intrinsic function component, respectively; $\hat{f}(\omega)$, $\hat{u}_i(\omega)$, and $\hat{\lambda}(\omega)$ represent an original signal after the Fourier transform, an i-th decomposed intrinsic function component after the Fourier transform, and the Lagrangian operator after the Fourier transform, respectively; $\hat{\lambda}^n(\omega)$ represents the Lagrangian operator after the Fourier transform of an n-th sample with a center frequency of $\omega$; $\hat{u}_k^{n+1}(\omega)$ represents a Fourier transform of the k-th decomposed intrinsic function component of the (n+1)-th sample with the center frequency of $\omega$; d represents a derivative symbol; $\hat{u}_k^n$ represents the Fourier transform of the k-th decomposed intrinsic function component of the n-th sample.

In 125, calculating the kurtosis coefficient $K_C$ of each of the intrinsic mode functions and the residual components, and selecting a component with a maximum $K_C$ as an optimal component, an expression of the kurtosis coefficient $K_C$ being (8):

$$K_C = \frac{E(x' - \mu)^4}{\sigma^4} \quad (8)$$

where $K_C$ represents the kurtosis coefficient, x' represents a detection signal, E represents an expected value, $\mu$ represents an average value, and $\sigma$ represents a standard deviation.

In 126, determining a mutation sampling point in the optimal component based on calculation of a change rate, an expression of the change rate being (9):

$$y(i) = \frac{x(i) - x(i-1)}{\Delta t} \quad (9)$$

where y represents the change rate, i represents a sampling point, x represents a value of the optimal component, and $\Delta t$ represents a time interval of the sampling point. A standard deviation of a detection result and an actual result at different starting thresholds $p_i$ and ending thresholds $p_t$ is calculated according to measured voltage sag data, and a threshold corresponding to a minimum standard deviation is determined as an optimal detection threshold; when $y(i) > p_i$, it represents that the voltage sag occurs, and when $y(i) < p_t$, it represents that the voltage sag ends.

In 127, for a phase a voltage, recording voltage instantaneous values $v_a(t_1)$ and $v_a(t_2)$ at a time $t_1$ when the voltage sag occurs and a time $t_2$ when the voltage sag ends according to the detection result, an expression of an instantaneous voltage change $\Delta v_a(t)$ being (10):

$$\Delta v_a(t) = v_a^{ref}(t) - v_a(t) \quad (10)$$

where $v_a^{ref}(t)$ represents a voltage reference value at the time t; $v_a(t)$ represents a voltage instantaneous value of the phase a voltage at the time t.

In 128, reconstructing a three-phase voltage instantaneous value into a space vector after the voltage sag occurs since most of existing equipment does not have a phase monitoring function, $\vec{v}(t_1)$ and $\vec{v}(t_2)$ representing three-phase voltage space vectors at the time $t_1$ and the time $t_2$, respectively, $n(t_1)$ and $n(t_2)$ representing an angle between the $\vec{v}(t_1)$ and a positive direction of a real axis and an angle between the $\vec{v}(t_2)$ and the positive direction of the real axis, respectively; an initial phase and an termination phase of the voltage sag of the phase a voltage being $m(t_1) = n(t_1) + (\pi/2)$ and $m(t_2) = n(t_2) + (\pi/2)$, respectively; expressions of the $n(t_1)$ and the $n(t_2)$ being:

$$\begin{cases} n(t_1) = \arctan\{\text{Im}[\vec{v}_a(t_1)]/\text{Re}[\vec{v}_a(t_1)]\} \\ n(t_2) = \arctan\{\text{Im}[\vec{v}_a(t_2)]/\text{Re}[\vec{v}_a(t_2)]\} \end{cases} \quad (11)$$

where Im represents an imaginary part, Re represents a real part; $\vec{v}_a(t_1)$ and $\vec{v}_a(t_2)$ represent the space vectors of the voltage instantaneous values $v_a(t_1)$ and $v_a(t_2)$ at the time $t_1$ when the voltage sag occurs and the time $t_2$ when the voltage sag ends, respectively.

In 129, obtaining a voltage sag feature of a phase b and a phase c, respectively, in the same way as the operations 121-128 described above.

In the embodiments of the present disclosure, the voltage sag feature is enhanced by the Teager-Kaiser energy operator, and the key component is selected by combining the variational mode decomposition and the kurtosis coefficient, which can achieve high precision detection at milliseconds and greatly improve the accuracy of determination for the starting and ending time of the voltage sag, thereby providing reliable trigger signals for subsequent compensation.

In some embodiments, the processor may generate a plurality of power distribution curves based on a voltage sag detection result; predict a life loss of the supercapacitor and a life loss of the lithium battery corresponding to the plurality of power distribution curves; and determine a target power distribution curve based on the life loss, the target power distribution curve including a supercapacitor output active power and a lithium battery output active power at each time point of a plurality of time points.

The voltage sag detection result refers to real-time and accurate detection data of the voltage sag on the grid side and the load side. The acquisition of the voltage sag detection result is described by the embodiments described above, which is not repeated here.

The power distribution curve refers to a temporal curve that represents a dynamic distribution relationship of the supercapacitor output active power and the lithium battery output active power at various future time points. In some embodiments, the power distribution curve includes the supercapacitor output active power and the lithium battery output active power at each of the plurality of future time points.

In some embodiments, the processor may randomly generate a potential attenuation curve of the supercapacitor output active power and a potential incremental curve of the lithium battery output active power under a constraint that a total output active power is constant, and dynamically adjust a power distribution proportion of the supercapacitor output active power and the lithium battery output active power until an output of the HESS fully meets a demand of the load R.

Merely by way of example, if the total output active power is 20 KW, and a ratio of a randomly generated potential increase value to a decrease value at a time point 1 is 0.5 KW, the supercapacitor output active power is 19.5 KW, and the lithium battery output active power is 0.5 KW. If the ratio of the randomly generated potential increase value to the decrease value at a time point 2 is 0.1 KW, the supercapacitor output active power is 19.4 KW, and the lithium battery output active power is 0.6 KW.

The life loss of the supercapacitor and the life loss of the lithium battery refer to cumulative damage to the supercapacitor and the lithium battery during charge and discharge cycles.

In some embodiments, the processor may determine the life loss of the supercapacitor and the life loss of the lithium battery corresponding to the plurality of power distribution curves based on a first preset table. The processor may construct the first preset table based on a historical count of charge and discharge times, a historical current value, a historical temperature, and a historical life loss corresponding to different power distribution curves. The first preset table may include the historical count of charge and discharge times, the historical current value, the historical temperature, and the corresponding historical life loss. The processor may determine a current life loss by querying the first preset table based on a current count of charge and discharge times, a current value, and a temperature.

The target power distribution curve refers to a final power distribution curve.

In some embodiments, the processor may determine the target power distribution curve based on the life loss of the supercapacitor and the life loss of the lithium battery. For example, the processor may perform weighted summation based on a life loss value of the supercapacitor and a life loss value of the lithium battery corresponding to each candidate power distribution curve to obtain a comprehensive life loss value corresponding to the each candidate power distribution curve. A candidate power distribution curve with a smallest comprehensive life loss value may be selected as the target power distribution curve. A weighting coefficient of the weighted summation may be configured according to an actual cost or a replacement cycle of the supercapacitor and the lithium battery.

In 130, achieving optimal energy compensation through flexible switching in an input stage and an output stage adopting a flexible optimal energy compensation strategy to prevent SE from tripping due to a phase jump caused by the optimal energy compensation. In some embodiments, the operation 130 may be performed by the compensation unit.

The flexible optimal energy compensation strategy refers to a compensation approach that realizes disturbance-free operation of the SE by dynamically adjusting an amplitude and a phase of the compensation voltage and eliminating the phase jump by adopting a progressive switching technique while minimizing energy storage.

The input stage refers to a process of inputting a compensation voltage. A voltage phase jump caused by sudden compensation may be avoided by slowly adjusting the amplitude and the phase of the compensation voltage during the input stage.

The output stage refers to a process of gradual withdrawal of the compensation system when the voltage is restored. In the output stage, the amplitude of the compensation voltage gradually decreases, and the load voltage is synchronized with the grid voltage by adjusting the phase, so as to prevent the phase jump.

The flexible switching refers to a control technique that realizes smooth transition between different operating modes or compensation states by gradually adjusting parameters such as a voltage/current amplitude, a phase, and a frequency, thus avoiding tripping of the equipment caused by sudden impacts.

In some embodiments, the compensation unit may adopt the flexible optimal energy compensation strategy, adopt progressive adjustment of the amplitude and the phase of the compensation voltage to achieve the smooth transition in the input stage/the output stage, and control the phase jump to be within ±2°, thereby avoiding the SE from tripping due to the phase jump.

Figure 6A:
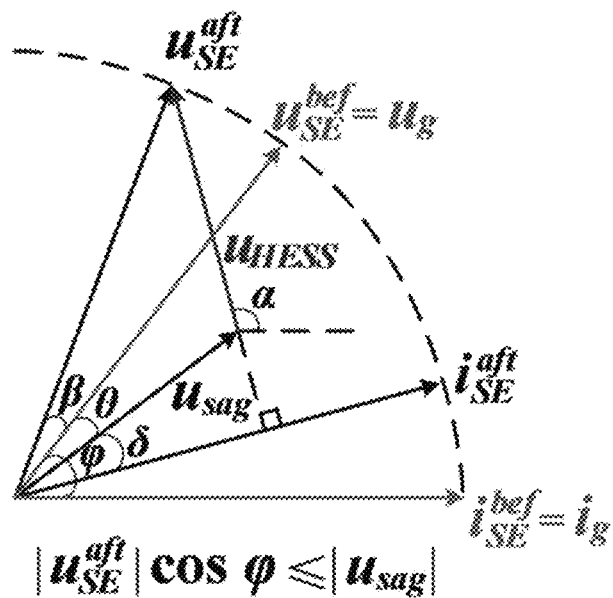
FIG. 6A is a vector diagram illustrating exemplary optimal energy compensation strategy when a shallow voltage sag occurs according to some embodiments of the present disclosure.
Figure 6B:
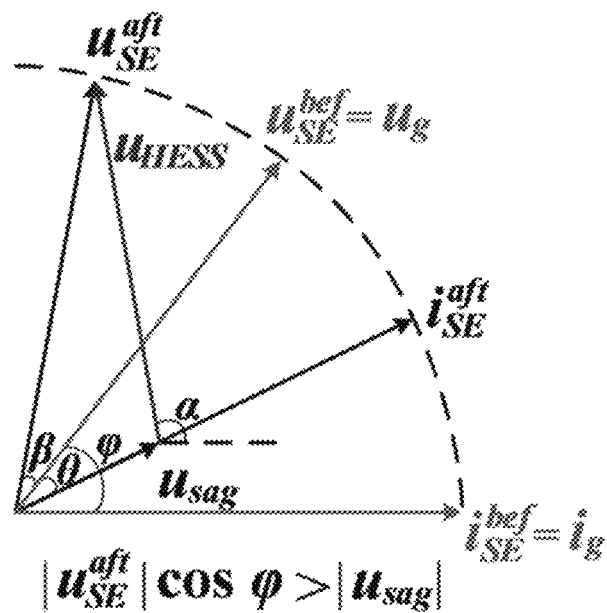
FIG. 6B is a vector diagram illustrating exemplary optimal energy compensation strategy when a deep voltage sag occurs according to some embodiments of the present disclosure.

FIG. 6A is a vector diagram illustrating exemplary optimal energy compensation strategy when a shallow voltage sag occurs according to some embodiments of the present disclosure. FIG. 6B is a vector diagram illustrating exemplary optimal energy compensation strategy when a deep voltage sag occurs according to some embodiments of the present disclosure. In some embodiments, using the phase a as an example, a fundamental principle of the optimal energy compensation strategy is shown in FIGS. 6A-6B.

In some embodiments, the operation 130 may be implemented by operations 131-134.

In 131, when the voltage sag occurs, an expression of active power $P_{HESS}$ output by the HESS being (12):

$$P_{HESS} = \left[|u_{SE}^{aft}|\cos\varphi - |u_{sag}|\cos\delta\right]|i_{SE}^{aft}| \tag{12}$$

where $u_{SE}^{aft}$ represents an SE voltage during the voltage sag, $u_{sag}$ represents a grid voltage during the voltage sag, $i_{SE}^{aft}$ represents an SE current during the voltage sag; $\varphi$ represents a power factor angle, $\delta$ represents a phase of the grid voltage $u_{sag}$ and the SE current $i_{SE}^{aft}$ during the voltage sag.

As shown in FIG. 6A, when the shallow voltage sag occurs, i.e., $|u_{SE}^{aft}|\cos\varphi \leq |u_{sag}|$: the phase $\delta$ is adjusted by a compensation voltage provided by the HESS, so that the compensation voltage $u_{HESS}$ provided by the HESS is perpendicular to the SE current $i_{SE}^{aft}$ during the voltage sag, i.e., the active power $P_{HESS}=0$; at this time, the HESS only provides reactive power to achieve the voltage sag control, an expression of the compensation voltage $u_{HESS}$ being (13):

$$\begin{cases} |U_{HESS}| = |u_{SE}^{bef}|\sin\varphi - |u_{sag}|\sin\delta \\ \alpha = \left(\frac{\pi}{2} - \delta\right) + (\varphi - \theta) \end{cases} \quad (13)$$

where $u_{SE}^{bef}$ represents an SE voltage before the voltage sag, the phase $\delta = \arccos\{[|u_{SE}^{bef}|\cos\varphi/|u_{sag}|]\}$, $\alpha$ represents the phase of the compensation voltage provided by the HESS, and $\theta$ represents the phase jump during the voltage sag.

As shown in FIG. 6B, when the deep voltage sag occurs, i.e., $|u_{SE}^{aft}|\cos\varphi > |u_{sag}|$, the phase $\delta$ is adjusted by the compensation voltage provided by the HESS, so that the compensation voltage $u_{HESS}$ is in the same phase as the SE current $i_{SE}^{aft}$ during the voltage sag; at this time, the expression of the compensation voltage $u_{HESS}$ is shown in (14):

$$\begin{cases} |u_{HESS}| = \sqrt{|u_{SE}^{bef}|^2 + |u_{sag}|^2 - 2|u_{SE}^{bef}||u_{sag}|\cos\varphi} \\ \alpha = \frac{\pi}{2} + \arctan\left[\frac{|u_{sag}|\cos(\varphi+\theta) - |u_{SE}^{bef}|\cos(2\varphi+\theta)}{|u_{SE}^{bef}|\sin(2\varphi+\theta) - |u_{sag}|\sin(\varphi+\theta)}\right] \end{cases} \quad (14)$$

In FIGS. 6A-6B, $i_g$ is a grid current without the voltage sag, $u_g$ is a grid voltage without the voltage sag, $i_{SE}^{bft}$ is a SE current before the voltage sag, and $\beta$ is a phase of $u_{SE}^{bef}$ and $u_{SE}^{aft}$, $U_{sc}$ is a supercapacitor voltage, and $U_{LB}$ is a lithium battery voltage.

In 132, in the input stage, the hybrid energy storage system providing the compensation voltage by voltage phase flexible switching to avoid causing a large phase jump.

According to a vector relationship, during the shallow voltage sag and the deep voltage sag, an expression of an amplitude $|u_{HESS}^{in}|$ of the compensation voltage provided by the HESS in the input stage is shown in (15):

$$|u_{HESS}^{in}| = \sqrt{|u_{SE}^{bef}|^2 + |u_{sag}|^2 - 2|u_{SE}^{bef}||u_{sag}|(\cos\varphi\cos\delta + \sin\varphi\sin\delta)} \quad (15)$$

Figure 7A:
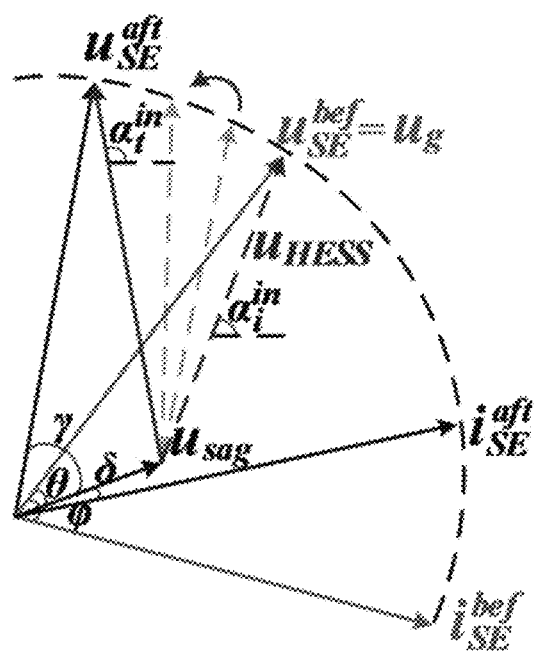
FIG. 7A is an amplitude diagram illustrating an exemplary compensation voltage of a flexible compensation strategy in an input stage according to some embodiments of the present disclosure.
Figure 7B:
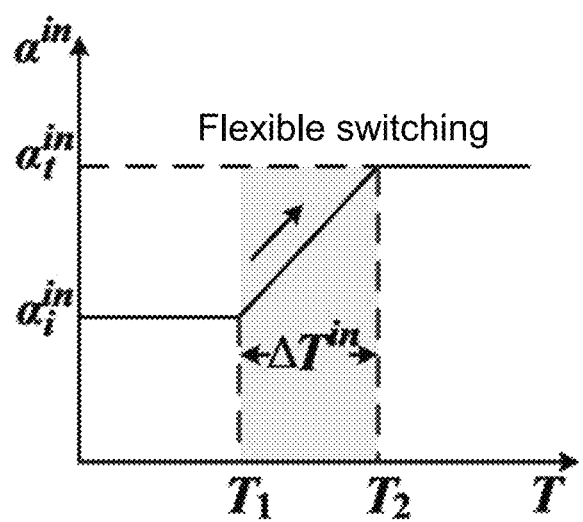
FIG. 7B is a phase diagram illustrating an exemplary compensation voltage of a flexible compensation strategy in an input stage according to some embodiments of the present disclosure.

FIG. 7A is an amplitude diagram illustrating an exemplary compensation voltage of a flexible compensation strategy in an input stage according to some embodiments of the present disclosure. FIG. 7B is a phase diagram illustrating an exemplary compensation voltage of a flexible compensation strategy in an input stage according to some embodiments of the present disclosure.

As shown in FIGS. 7A-7B, according to the vector relationship, during the shallow voltage sag and the deep voltage sag, an expression of an initial phase $\alpha_i^{in}$ of the compensation voltage provided by the HESS in the input stage is shown in (16)-(17):

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right] + \pi \quad (16)$$

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right] \quad (17)$$

According to the vector relationship, during the shallow voltage sag and the deep voltage sag, a termination phase $\alpha_t^{in}$ of the compensation voltage provided by the HESS in the input stage is the phase $\alpha$ of the compensation voltage, i.e.: $\alpha_t^{in} = \alpha$.

In the input stage, the SE undergoes the phase jump $\theta$ before the voltage sag control, if no tripping occurs at this time, it indicates that the phase jump tolerated by the SE is $\theta$; the initial phase $\alpha_i^{in}$ of the compensation voltage provided by the HESS and a load voltage maintained in a state $u_L^{bef}$ before the voltage sag through an input transition stage $\Delta T^{in}$ are flexibly switched to the termination phase $\alpha_t^{in}$ of the compensation voltage provided by the HESS and the state $u_L^{aft}$ of the load voltage of the optimal energy compensation strategy.

According to a phase change in the input stage, an expression of the voltage phase flexible switching is shown in (18):

$$\alpha^{in} = \alpha_i^{in} + (\alpha_t^{in} - \alpha_i^{in})\frac{(T-T_1)}{\Delta T^{in}} T_1 \leq T \leq T_2 \quad (18)$$

where $\alpha^{in}$ represents a phase of the compensation voltage provided by the HESS in the input stage, $T_1$ and $T_2$ represents an initiation time and a termination time of the input stage, respectively; T represents a current time; $\alpha_i^{in}$ and $\alpha_t^{in}$ represent the initial phase and the termination phase, respectively.

An expression of the input transition stage $\Delta T^{in}$ is shown in (19):

$$\Delta T^{in} = \left\lceil\frac{\gamma}{\theta}\right\rceil \times s_l \quad (19)$$

where $\gamma$ represents the phase jump before and after the voltage sag control of the HESS, when the shallow voltage sag occurs, $\gamma = \varphi - \delta$, when the deep voltage sag occurs, $\gamma = \varphi$; a count of steps is calculated by rounding up $\gamma/\theta$, and the input transition stage is calculated according to a switching step $s_l$. The flexible switching based on the voltage phase in the input stage avoids the SE from tripping caused by a large phase jump.

In 133, in the output stage, the HESS providing the compensation voltage by the voltage phase flexible switching to avoid causing the large phase jump. For example, a large phase jump may be avoided by flexible switching of the compensation voltage.

According to the vector relationship, an expression of the amplitude $|u_{HESS}^{out}|$ of the compensation voltage provided by the HESS in the output stage is shown in (20):

$$|u_{HESS}^{out}| = 2|u_{SE}^{bef}|\cos\left[\frac{\pi-\xi}{2} + (\alpha_m^{out} - \alpha^{out})\right] \quad (20)$$

where $\xi$ represents a phase jump occurring to the SE when the voltage sag recovers; $\alpha_m^{out}$ represents an intermediate phase of the compensation voltage provided by the HESS in the output stage, and $\alpha^{out}$ represents a phase of the compensation voltage provided by the HESS in the output stage.

Figure 8A:
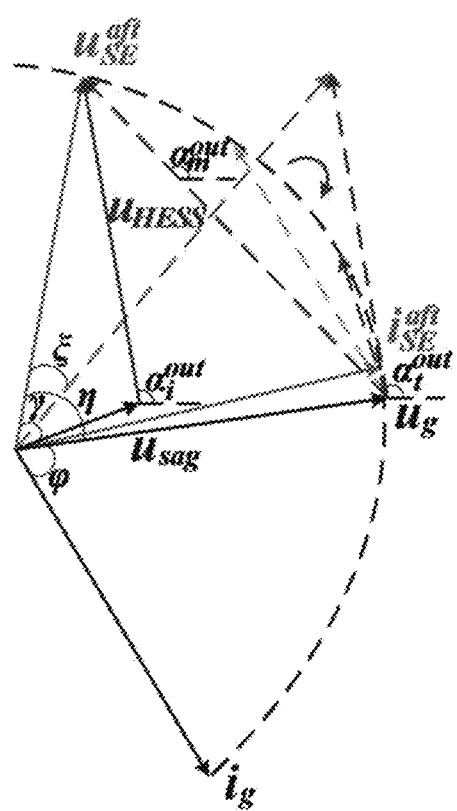
FIG. 8A is an amplitude diagram illustrating an exemplary compensation voltage of a flexible compensation strategy in an output stage according to some embodiments of the present disclosure.
Figure 8B:
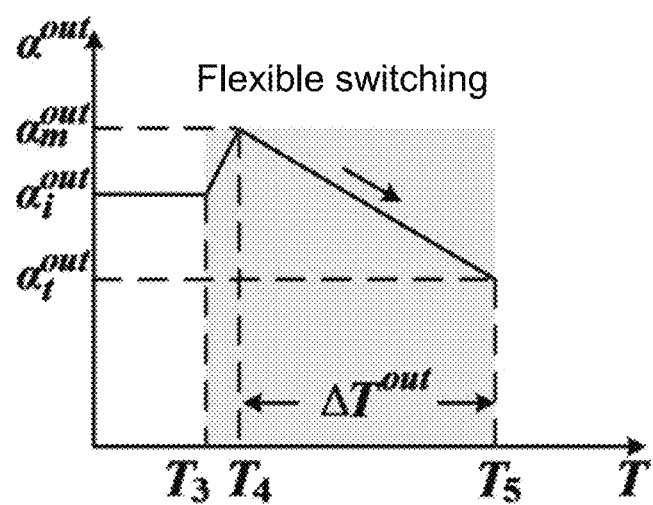
FIG. 8B is a phase diagram illustrating an exemplary compensation voltage of a flexible compensation strategy in an output stage according to some embodiments of the present disclosure.

FIG. 8A is an amplitude diagram illustrating an exemplary compensation voltage of a flexible compensation strategy in an output stage according to some embodiments of the present disclosure. FIG. 8B is a phase diagram illustrating an exemplary compensation voltage of a flexible compensation strategy in an output stage according to some embodiments of the present disclosure. In FIGS. 8A-8B, $\alpha_i^{out}$, $\alpha_m^{out}$, and $\alpha_t^{out}$ represent the initial phase, the intermediate phase, and the termination phase, respectively; $T_3$, $T_4$, and $T_5$ represent an initiation time, an intermediate time, and an termination time of the output stage, respectively; and $\Delta T^{out}$ represents an output transition stage.

As shown in FIGS. 8A-8B, according to the vector relationship, expressions of the initial phase $\alpha$out, the intermediate phase $\alpha_i^{out}$, and the termination phase $\alpha$out of the compensation voltage provided by the HESS in the output stage are shown in (21):

$$\begin{cases} \alpha_i^{out} = \alpha_t^{in} \\ \alpha_m^{out} = \pi/2 + (3\varphi)/2 + \theta \\ \alpha_t^{out} = \pi/2 + \varphi \end{cases} \quad (21)$$

In the output stage, the initial phase $\alpha_i^{out}$ of the compensation voltage provided by the HESS is equal to the termination phase $\alpha_t^{in}$ in the input stage; the phase jump $\xi$ occurs to the SE when the voltage sag recovers, if no tripping occurs at this time, it indicates that the phase jump tolerated by the SE is $\xi$; the initial phase $\alpha_i^{out}$ of the compensation voltage provided by the HESS is instantaneously switched to the intermediate phase $\alpha_m^{out}$, and the load voltage is maintained at the phase state $u_L^{aft}$ during the voltage sag, no tripping occurs when the phase jump $\xi$ occurs to the SE again; the termination phase $\alpha_t^{out}$ of the compensation voltage provided by the HESS is flexibly switched on through the output transition stage $\Delta T^{out}$, and the load voltage is restored to a normal grid voltage $u_g$.

According to the phase change in the output stage, the expression of voltage phase flexible switching is shown in (22):

$$\alpha^{out} = \alpha_m^{out} - (\alpha_t^{out} - \alpha_m^{out})\frac{(T-T_4)}{\Delta T^{out}} \quad T_4 \leq T \leq T_5 \quad (22)$$

where $\alpha^{out}$ represents the phase of the compensation voltage provided by the HESS in the output stage, $T_4$ and $T_5$ represent the intermediate time and the termination time of the output stage, respectively.

The expression of the output transition stage $\Delta T^{out}$ is (23):

$$\Delta T^{out} = \left\lceil \frac{\eta}{\max(\theta, \xi)} \right\rceil \times s_l \quad (23)$$

where $\eta$ represents the phase jump when the voltage sag recovers, the count of steps is calculated by rounding up $$\frac{\eta}{\max(\theta, \xi)},$$

and the output transition stage is calculated according to the switching step $s_l$. The flexible switching based on the voltage phase in the output stage avoids the SE from tripping caused by the large phase jump.

In some embodiments, the flexible optimal energy compensation strategies of the phase b and the phase c are the same as the phase a.

In the embodiments of the present disclosure, zero active compensation during the shallow voltage sag and optimal active compensation during the deep voltage sag based on the optimal energy compensation strategy can effectively reduce energy consumption of the HESS. However, the voltage sag control based on the optimal energy compensation strategy produces the large phase jump causing the SE to trip. Accordingly, the flexible compensation strategies for the input stage and the output stage are provided to avoid the large phase jump.

In some embodiments, during the evolution from the time when the voltage sag occurs to transient stabilization, the processor may control, at each time point, operation of the supercapacitor based on the supercapacitor output active power in the target power distribution curve at the time point; control operation of the lithium battery based on the lithium battery output active power in the target power distribution curve at the time point.

In the embodiments of the present disclosure, by dynamically adjusting the power distribution proportion of the supercapacitor and the lithium battery, the comprehensive life loss of the HESS can be effectively reduced while ensuring the reliable operation of the SE, and the comprehensive maintenance cost of the HESS can be reduced. That is, the life loss of the supercapacitor and the lithium battery can be reduced while ensuring the operation of the SE as much as possible. Compared with the conventional DVR, considering that the lithium battery serves as an existing device for peak-valley arbitrage, the embodiment of the present disclosure can reduce costs by shortening the control time through the supercapacitor.

In some embodiments, after operating based on the target power distribution curve, the processor may obtain a tripping record and correct the target power distribution curve based on the tripping record; at each time point during the evolution from the time when the voltage sag occurs to the transient stabilization: control the operation of the supercapacitor based on the supercapacitor output active power in a corrected target power distribution curve at the time point; and control the operation of the lithium battery based on the lithium battery output active power in the corrected target power distribution curve at the time point.

More descriptions regarding the tripping record may be found in FIG. 12 and the related descriptions thereof.

In some embodiments, the processor may correct the target power distribution curve based on a frequency of the tripping record. In some embodiments, the frequency of the tripping record is negatively correlated to a ratio of an increase value to a decrease value of the active power. For example, the processor counts the frequency of the tripping record of the SE, and the higher the frequency, the smaller the ratio of the increase value to the decrease value of the active power is adjusted per unit of time so as to eliminate tripping of the SE caused by a sudden change in the power.

In 140, on a DC/DC side, coordinating power output through power frequency division control according to a difference in response features between the supercapacitor and the lithium battery energy storage system; on a DC/AC side, performing composite control through a voltage feedforward loop, a voltage feedback outer loop, and a current feedback inner loop, and eliminating a secondary effect of harmonics on the SE using a proportional integral quasi-resonance controller. In some embodiments, the operation 140 may be performed by the control system.

In the flexible optimal energy compensation strategy, during the shallow voltage sag, the HESS needs to provide the active power only in the input stage and the output stage, and during the deep voltage sag, the HESS needs to provide the active power in the whole process. In case of the voltage sag, an active power demand of the SE may be divided into a low-frequency component and a high-frequency component. At the time of the voltage sag, the active power demand of the SE is the high-frequency component due to a rapid voltage change. According to a very fast response speed of the supercapacitor, the active power is output based on the fast response to control the voltage sag of the SE. During the evolution from the time when the voltage sag occurs to the transient stabilization, the active power demand of the SE for the high-frequency component gradually decreases, while the active power demand of the SE for the low-frequency component gradually increases. The supercapacitor output active power gradually decreases, and the lithium battery output active power gradually increases, which jointly controls the voltage sag of the SE. In the transient stabilization of the voltage sag, the active power demand of the SE is the low-frequency component due to a constant active power required by the SE. According to the significant energy reserve of the lithium battery, the lithium battery continuously discharges to output the active power to control the voltage sag of the SE.

The power frequency division control refers to a control technique that distributes a power demand by frequency through a low-pass/high-pass filter. For example, a low frequency is responded by the lithium battery, and a high frequency is responded by the supercapacitor, thereby realizing dynamic cooperation of hybrid energy storage.

The voltage feedforward loop refers to an open-loop control technique that generates a compensation signal directly by detecting input voltage disturbance in real time, which can realize ultra-fast response bypassing a feedback delay.

The voltage feedback outer loop refers to a closed-loop control technique that monitors an output voltage deviation in real time and calculates a compensation amount through a PI controller to ensure the steady-state accuracy and stability of the load voltage.

The current feedback inner loop refers to a closed-loop control technique that realizes accurate control of current by tracking a current instruction in real time and comparing the tracked current with an actual current, and outputting a control signal after the PI controller.

In some embodiments, the control system may decompose, based on the difference in the response features between the supercapacitor and the lithium battery energy storage system, a total power demand into the low-frequency component (undertaken by the lithium battery with a high-energy density) and the high-frequency component (undertaken by the supercapacitor with a high-power-density) through the power frequency division control to dynamically coordinate the power output of the supercapacitor and the lithium battery energy storage system.

Figure 9:
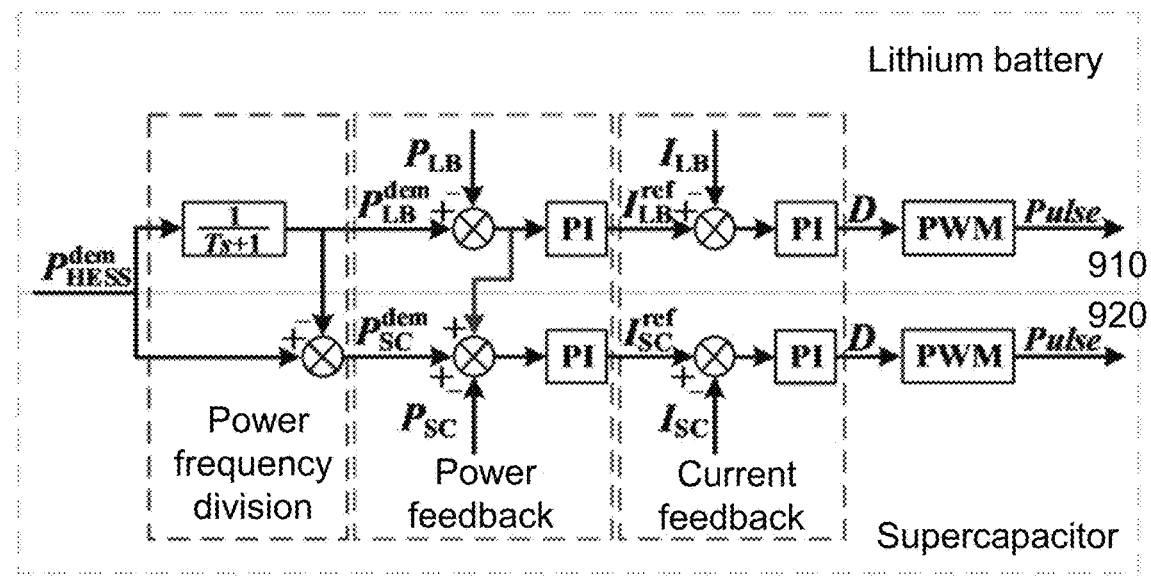
FIG. 9 is a schematic diagram illustrating an exemplary power frequency division control system according to some embodiments of the present disclosure.

FIG. 9 is a schematic diagram illustrating an exemplary power frequency division control system according to some embodiments of the present disclosure. In some embodiments, as shown in FIG. 9, a DC/DC converter in the lithium battery and the supercapacitor is controlled as shown in an upper half dashed box 910 and a lower half dashed box 920 in FIG. 9, respectively.

In 141, under the voltage sag, the active power demand of the SE being divided into a low-frequency component and a high-frequency component; obtaining an active power demand value $P_{HESS}^{dem}$ by summing a three-phase active power $P_{HESS}$ of the hybrid energy storage system, allocating the active power demand value $P_{HESS}^{dem}$ of the lithium battery and the supercapacitor according to the low-frequency component and the high-frequency component through a low-pass filter, i.e., $p_{LB}^{dem}$ and $P_{SC}^{dem}$.

In the lithium battery, a current reference value $I_{LB}^{ref}$ of the lithium battery is calculated according to a difference between the active power demand value $P_{LB}^{dem}$ of the lithium battery and an active power measurement value $P_{LB}$ of the lithium battery.

In the supercapacitor, a current reference value $I_{SC}^{ref}$ of the supercapacitor is calculated by adding a difference between the $P_{SC}^{dem}$ and the $P_{LB}$ to a difference between the active power demand value $P_{SC}^{dem}$ of the supercapacitor and an active power measurement value $P_{SC}$ of the supercapacitor.

A duty ratio of the lithium battery is calculated according to a difference between the current reference value $I_{LB}^{ref}$ of the lithium battery and a current measurement value $I_{LB}$ of the lithium battery by the current feedback inner loop; a duty ratio of the supercapacitor according to a difference between the current reference value $II_{SC}^{ref}$ of the supercapacitor and a current measurement value $I_{SC}$ of the supercapacitor, thereby generating a pulse signal by pulse width modulation.

In 142, constructing a composite control system including the voltage feedforward loop, the voltage feedback outer loop, and the current feedback inner loop to control the DC/AC converter according to the flexible optimal energy compensation ref strategy and a reference value $u_{HESS}^{ref}$ of the compensation voltage provided by the hybrid energy storage system.

Figure 10:
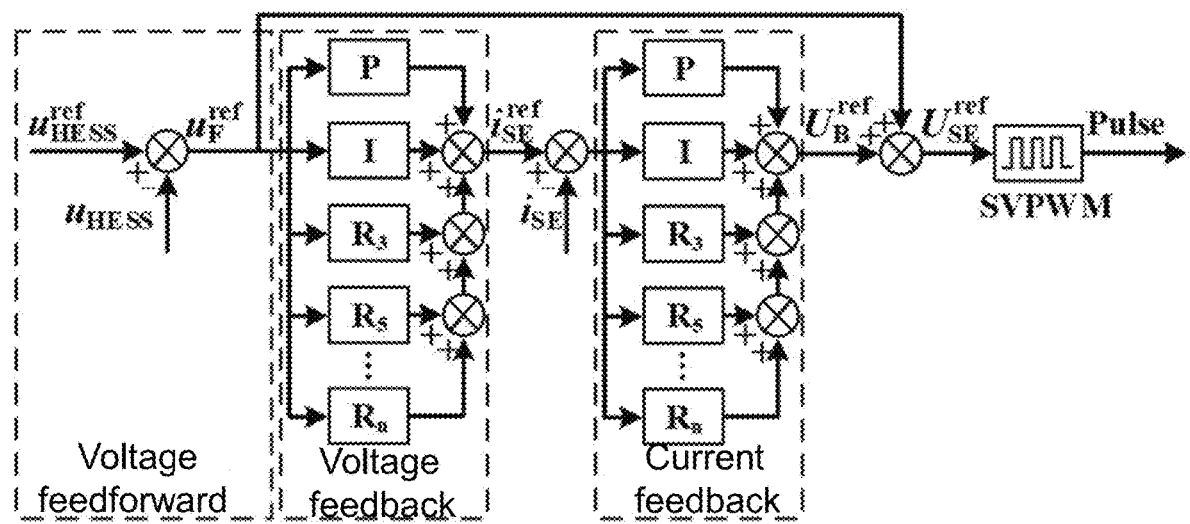
FIG. 10 is a schematic diagram illustrating an exemplary composite control system according to some embodiments of the present disclosure.

FIG. 10 is a schematic diagram illustrating an exemplary composite control system according to some embodiments of the present disclosure. As shown in FIG. 10, $R_3$-$R_n$ is a transfer function of quasi-resonance control of a (3–n)-th harmonic.

A feedforward voltage reference value $u_F^{ref}$ of the hybrid energy storage system is calculated according to a difference between a reference value $u_{HESS}^{ref}$ of the compensation voltage and the compensation voltage $u_{HESS}$ of the hybrid energy storage system by the voltage feedforward loop; the current reference value $i_{SE}^{ref}$ of the SE is calculated according to the feedforward voltage reference value $u_F^{ref}$ by the voltage feedback outer loop; a feedback voltage reference value $U_B^{ref}$ of the hybrid energy storage system is calculated according to a difference between the $i_{SE}^{ref}$ and a current $i_{SE}$ of the SE, and a voltage reference value $U_{SE}^{ref}$ of the SE is calculated according to the feedforward voltage reference value $u_F^{ref}$ and the feedback voltage reference value $U_B^{ref}$ by the current feedback inner loop.

In 143, adding a quasi-resonance controller to a PI controller of voltage feedback and current feedback to achieve static error free tracking of an AC signal and eliminate harmonics of a specific frequency, an expression of a transfer function of the quasi-resonance controller being shown in (24):

$$G_{QR(s)} = \frac{2\omega_c K_r s}{s^2 + 2\omega_c s + \omega_0^2} \tag{24}$$

where $K_r$ represents a gain of an n-order quasi-resonance controller, $\omega_0$ represents a fundamental frequency, $\omega_c$ represents a resonance frequency bandwidth; and s represents a Laplace operator. An expression of the transfer function of a proportional integral multi-quasi-resonance (PIMQR) controller used to control odd-order harmonics is shown in (25):

$$G_{PIMQR(S)} = K_p + \frac{K_i}{s} + \sum_{n=3,5,7,9,\ldots} \frac{2\omega_c K_r s}{s^2 + 2\omega_c s + (n\omega_0)^2} \tag{25}$$

where $K_p$ represents a proportional coefficient, and $K_i$ represents an integral coefficient.

Figure 11:
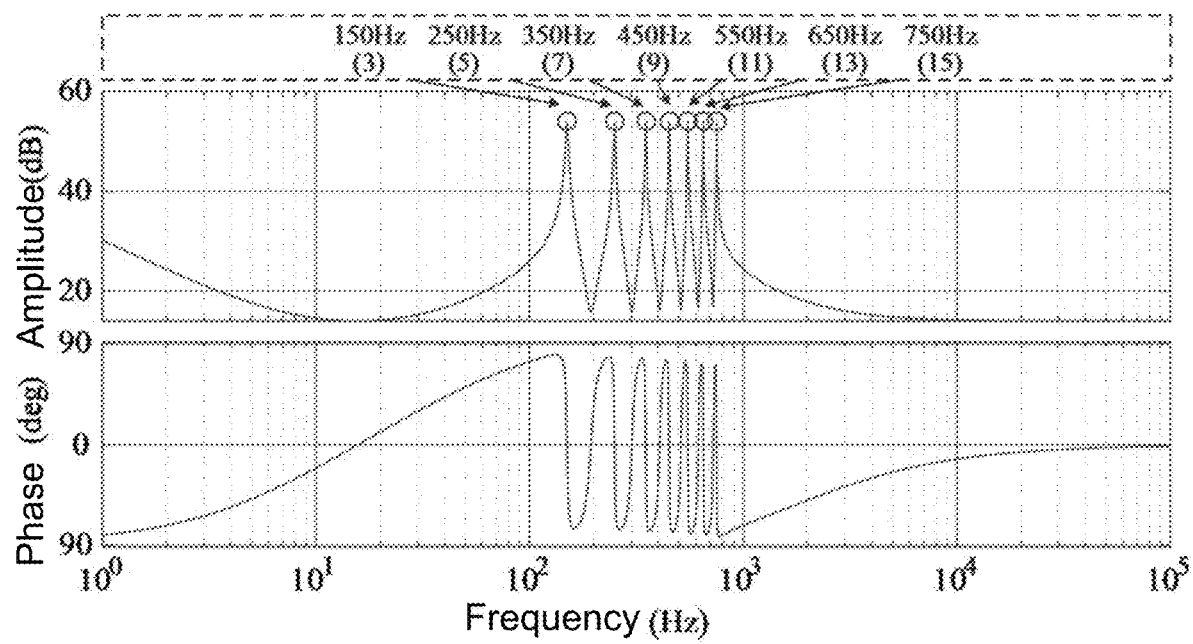
FIG. 11 is a bode plot illustrating a PIMQR controller according to some embodiments of the present disclosure.

A bode plot of the PIMQR controller for a 3rd-order harmonic (150 Hz), a 5th-order harmonic (250 Hz), a 7th-order harmonic (350 Hz), a 9th-order harmonic (450 Hz), a 11th-order harmonic (550 Hz), a 13th-order harmonic (650 Hz), and a 15th-order harmonic (750 Hz) designed for the SE is as shown in FIG. 11.

In the embodiments of the present disclosure, the PIMQR controller features a high gain at specific frequencies, and each specific frequency does not interfere with each other. Resonance does not occur at non-specific frequencies, and harmonics at the specific frequencies can be controlled.

In the embodiments of the present disclosure, the efficient control of the voltage sag is achieved through the cooperative control of the supercapacitor and the lithium battery, with the supercapacitor being responsible for the fast response to the early stage of the voltage sag, while the lithium battery providing continuous power supply; and the recognition accuracy of the voltage sag is enhanced using the improved signal detection approach; the voltage amplitude and phase are dynamically adjusted through the flexible optimal energy compensation strategy to optimize energy consumption while avoiding the phase jump; by integrating the power frequency division and composite control strategies, the advantages of the hybrid energy storage system are fully leveraged, thereby significantly improving the control efficiency and suppressing harmonic interference.

FIG. 12 is a flowchart illustrating an exemplary process of controlling an operation mode according to some embodiments of the present disclosure. As shown in FIG. 12, a process 1200 may include the following operations. In some embodiments, the process 1200 may be performed by the processor.

In 1210, predicting a future load operation demand and a future voltage sag trend based on voltage sag data, a power grid operation parameter, and load operation data.

The voltage sag data refers to data related to the voltage sag. For example, the voltage sag data may include a location (e.g., a grid side, and a load side), an occurrence time (e.g., a starting and ending time and a duration of the voltage sag), a sag amplitude, or the like, of the voltage sag that occurs at a historical time.

In some embodiments, the voltage sag data may be obtained in various ways. For example, the processor may collect a voltage waveform from a voltage sensor provided on the grid side and the load side, and obtain the location of the voltage sag by analyzing a mutation feature of the voltage amplitude and the voltage phase. As another example, the processor may obtain the starting and ending time, the duration, the sag amplitude, or the like, of the voltage sag, by monitoring a current mutation using a current sensor.

The power grid operation parameter refers to a parameter related to an operation state of the power grid. For example, the power grid operation parameter may include a grid load condition, a line state, a grid distribution, or the like. The grid load condition refers an actual electrical power consumed by the power grid. The line condition refers to a parameter that describes the operation state of a line, such as a voltage, a current, an impedance, or the like. The power grid distribution refers to a physical layout and a logical architecture in the power grid.

In some embodiments, the power grid operation parameter may be obtained in various ways. For example, the processor may collect the grid load condition, the line state, or a load type in real time via a smart meter, an SCADA system, or a PMU equipment, etc. As another example, the processor may obtain grid distribution data via a topology analysis tool of a grid dispatching center or a GIS system.

The load operation data refers to data reflecting an operation state of the SE in the power grid. For example, the load operation data may include a load number, a load power, a load operation time, or the like.

In some embodiments, the load operation data may be obtained in various ways. For example, the load number may be obtained via an RFID tag or a barcode scanner built in equipment. The load power may be obtained from the smart meter, a power sensor (e.g., a Hall sensor), or the like. The load operation time may be obtained from a programmable logic controller (PLC).

The future load operation demand refers to a use demand of load operation in a future time period. For example, the future load operation demand may include an expected load power, an expected load operation time, or the like.

The future voltage sag trend refers to a change pattern related to the voltage sag data that may occur in the future time period. In some embodiments, the future voltage sag trend includes a future occurrence time and a future sag amplitude. The future time period may be a preset time period set by those skilled in the art based on experience or set by default by the system, such as 6 hours, 24 hours, 7 days, or the like.

In some embodiments, the processor may predict the future load operation demand and the future voltage sag trend in various ways. For example, the processor may predict the future load operation demand and the future voltage sag trend based on the voltage sag data, the power grid operation parameter, and the load operation data by fusing the voltage sag data and a grid topology through a machine learning model.

In some embodiments, the processor may predict the future load operation demand and the future voltage sag trend through a prediction model.

In some embodiments, the prediction model may be a machine learning model, such as a recurrent neural network (RNN) model, etc.

In some embodiments, an input of the prediction model may include the voltage sag data, the power grid operation parameter, and the load operation data, and an output of the prediction model may include the future load operation demand and the future voltage sag trend.

In some embodiments, the prediction model may be obtained by training based on a large number of first training samples with first labels. The processor may input a plurality of first training samples with the first labels into an initial prediction model, construct a loss function through the first labels and results of the initial prediction model, and iteratively update the initial prediction model based on the loss function. The training of the model is completed when a preset condition is satisfied, and a trained prediction model is obtained. The preset condition may be that the loss function converges, a count of iterations reaches a threshold, or the like.

In some embodiments, the first training samples may include sample voltage sag data, a sample power grid operation parameter, and sample load operation data in historical data. The first labels may be actual load operation data and actual voltage sag data of the first training samples after a preset time period. The preset time period may be 6 hours, 24 hours, 7 days, or the like.

In some embodiments, the input of the prediction model may further include weather forecast data, and accordingly, the training samples for the prediction model may include historical weather data.

The weather forecast data refers to information about a weather condition in the industrial park where the SE is located for the future time period. For example, the weather forecast data may include predicted values of parameters such as a temperature, a rainfall, a wind speed, a humidity, or the like. In some embodiments, the processor may obtain the weather forecast data through a public weather forecast website.

In some embodiments, before inputting the historical weather data and the weather forecast data into the prediction model, the processor may perform preprocessing of the historical weather data, including: performing correlation analysis of the historical weather data based on the voltage sag data to determine a weather data type related to the voltage sag; and performing dimensionality reduction on the historical weather data based on the weather data type.

In some embodiments, correlation between the historical weather data and the voltage sag data may be determined by a correlation coefficient. For example, the correlation coefficient may include the Pearson correlation coefficient, or the like. The processor may determine the correlation coefficient between the historical weather data and the voltage sag based on the voltage sag data, and determine a weather data type of which the correlation coefficient is greater than a coefficient threshold as the weather data type related to the voltage sag.

In some embodiments, the processor may perform dimensionality reduction on the historical weather data based on the related weather data type, retain only weather elements (e.g., thunder and lightning, a heavy precipitation, a high wind, and other weather data types that may cause a power outage in the power grid) that are related to the voltage sag (e.g., the weather data type with the correlation coefficient that is greater than the coefficient threshold), and eliminate irrelevant weather data.

In some embodiments, by the correlation analysis, the processor can filter out historical weather data that is significantly correlated with the voltage sag data, while eliminating irrelevant or redundant weather features, thereby effectively reducing a total amount of weather data while reducing the computing load of the processor.

In some embodiments, the input of the prediction model may further include a tripping record and a state of health (SOH) of the lithium battery, and the training samples may include a sample tripping record and a sample SOH of the lithium battery.

The tripping record refers to historical unscheduled outage data of the SE in the power grid that is affected by the voltage sag. In some embodiments, the tripping record may reflect the SOH of the HESS. For example, the HESS tends to be unhealthy when the tripping record shows an increasing trend.

In some embodiments, the processor may obtain the tripping record in various ways. For example, the processor may collect the tripping record in real time via, for example, a voltage sag monitor or a power quality analyzer provided on a critical load side.

The SOH of the lithium battery refers to a current actual performance of the lithium battery. In some embodiments, the processor may obtain the SOH of the lithium battery in various ways. For example, the processor may obtain the SOH of the lithium battery by monitoring through a battery management system (BMS).

Accordingly, when the input of the prediction model includes the tripping record and the SOH of the lithium battery, the first training samples may include a sample tripping record and a sample SOH of the lithium battery.

In some embodiments of the present disclosure, by using the tripping record and the SOH of the lithium battery as the input of the prediction model, real-time performance attenuation of the HESS can be more comprehensively reflected, thereby increasing the prediction accuracy.

In some embodiments of the present disclosure, the processor may accurately predict the future load operation demand and the future voltage sag trend using the machine learning model based on parameters such as the voltage sag data and the weather forecast data, and provide an early warning of the risk of a sudden power outage caused by extreme weather, thereby optimizing the grid dispatching strategy, improving the stability of the power system, and reducing the risk of damage to the SE caused by the voltage sag.

In 1220, determining an adjustment and control strategy of a DC/DC side and a DC/AC side based on the future load operation demand and the future voltage sag trend, the adjustment and control strategy including a supercapacitor output power and a lithium battery output power at a future time point.

The adjustment and control strategy refers to a control mode related to the DC/DC side and the DC/AC side. In some embodiments, the adjustment and control strategy may include the supercapacitor output power and the lithium battery output power at the future time point. The future time point may correspond to the time point of the future load operation demand.

In some embodiments, the processor may determine the adjustment and control strategy based on a second preset table. The processor may construct the second preset table based on preferred historical data. The preferred historical data refers to historical data when the power grid operates steadily for a long time period. For example, data in which the tripping record is less than a count threshold in a long time period in the historical data may be determined as the preferred historical data.

In some embodiments, the second preset table may include the future load operation demand, the future voltage sag trend and the corresponding adjustment and control strategy in the preferred historical data. The processor may determine a current adjustment and control strategy by querying the second preset table based on a current future load operation demand and a current future voltage sag trend.

In 1230, performing, based on the supercapacitor output power and the lithium battery output power at the future time point, controlling turning on or turning off of a thyristor, controlling closing or disconnecting of a switch, or controlling a DC/AC inverter to stop receiving a pulse signal, or any combination thereof.

In some embodiments, the processor may transform the supercapacitor output power and the lithium battery output power at the future time point to one of a first mode, a second mode, a third mode, or a fourth mode based on a third preset table, and perform, based on different operation modes, controlling turning on or turning off of the thyristor, controlling closing or disconnecting of the switch, or controlling the DC/AC inverter to stop receiving the pulse signal, or any combination thereof.

The processor may construct the third preset table based on the preferred historical data. In some embodiments, the third preset table may include the supercapacitor output power and the lithium battery output power in the preferred historical data and the corresponding operation modes. The processor may determine the operation mode after transformation by querying the third preset table based on the supercapacitor output power and the lithium battery output power at the future time point.

It should be noted that the foregoing description of the processes 100 and 1200 is for the purpose of exemplification and illustration only and does not limit the scope of application of the present disclosure. For those skilled in the art, various corrections and changes can be made to the processes 100 and 1200 under the guidance of the present disclosure. However, these corrections and changes remain within the scope of the present disclosure.

One or more embodiments of the present disclosure provide a non-transitory computer-readable storage medium, comprising computer instructions that, when read by a computer, may direct the computer to implement the method for SE voltage sag control based on flexible multiplexing of the energy storage system as illustrated in any of the embodiments of the present disclosure.

Finally, it should be noted that the above embodiments are only used to illustrate the technical solutions of the present disclosure rather than to limit them, and although the present disclosure has been described in detail with reference to the preferred embodiments, those having ordinary skills in the art should understand that it is still possible to perform modifications or equivalent replacements to the technical solution of the present disclosure. Such modifications or equivalent replacements do not make the modified technical solution deviate from the spirit and scope of the technical solution of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%.

Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for sensitive equipment (SE) voltage sag control based on flexible multiplexing of an energy storage system, comprising:
    constructing a topological structure for a hybrid energy storage system to control a voltage sag, wherein the hybrid energy storage system includes a lithium battery energy storage system and a supercapacitor, controlling of an early stage of the voltage sag is achieved by the supercapacitor, and continuous controlling of a late stage of the voltage sag is achieved by the lithium battery energy storage system;

achieving real-time and accurate detection of the voltage sag on a grid side and a load side by adopting an improved variational mode decomposition detection approach based on a Teager-Kaiser energy operator and a kurtosis coefficient;

achieving optimal energy compensation through flexible switching in an input stage and an output stage adopting a flexible optimal energy compensation strategy to prevent SE from tripping due to a phase jump caused by the optimal energy compensation;

on a DC/DC side, coordinating power output through power frequency division control according to a difference in response features between the supercapacitor and the lithium battery energy storage system;

on a DC/AC side, performing composite control through a voltage feedforward loop, a voltage feedback outer loop, and a current feedback inner loop, and eliminating a secondary effect of harmonics on the SE using a proportional integral quasi-resonance controller.

2. The method of claim 1, wherein the constructing a topological structure for a hybrid energy storage system to control a voltage sag includes:

the hybrid energy storage system including a lithium battery; the supercapacitor being connected in series with a switch S and then connected in parallel with the lithium battery;

the hybrid energy storage system being connected in parallel with a power grid to achieve peak-valley arbitrage, and being connected to the power grid via a DC/AC converter, an LC filter, and a thyristor in sequence;

the hybrid energy storage system being connected in series with the SE for voltage sag control, and being connected to a load R via a DC bus, a DC/AC inverter, the LC filter, and a transformer in sequence by coupling; wherein the topological structure includes four operation modes:

a first mode is a peak-valley arbitrage charging mode: during a period of low electricity price, the thyristor is turned on and the switch S is closed, the load R is in a grid-connected operation state, and a grid voltage $U_{grid}$ supplies power to the load R; the lithium battery and the supercapacitor are charged by the power grid using grid-connected constant power control; when charging is completed, the grid-connected constant power control stops outputting a pulse signal to the DC/AC inverter, and the hybrid energy storage system is in a standby state with full power;

a second mode is a peak-valley arbitrage discharging mode: during a period of high electricity price, the thyristor is turned off and the switch S is disconnected, the load R is in an islanded operation state, and the load R is powered by the lithium battery using constant voltage and constant frequency control; when discharging is completed, the thyristor is turned on, and the load resumes the grid-connected operation state, the load R is powered by the power grid; the hybrid energy storage system is in the standby state with surplus power, waiting for the period of low electricity price to start charging;

a third mode is an early stage mode of the voltage sag control: when the voltage sag occurs, the grid voltage and the hybrid energy storage system jointly supply power to the load R; the switch S is closed, and the supercapacitor and the lithium battery supply power simultaneously; the supercapacitor outputs a power exceeding a specific value within a set time threshold to achieve the voltage sag control; and the power of the supercapacitor decreases as an output power of the lithium battery increases;

a fourth mode is a late stage mode of the voltage sag control: as the output power of the lithium battery increases, when the output power of the lithium battery reaches a compensation power required by the load R, the output power of the supercapacitor is 0, the switch S is disconnected, and the load R is powered by the power grid and the lithium battery simultaneously.

3. The method of claim 2, wherein in the peak-valley arbitrage charging mode of the first mode, the grid-connected constant power control includes:

obtaining grid side voltage instantaneous values $e_a$, $e_b$, and $e_c$ by voltage sampling, obtaining a voltage phase $\theta_1$ through a phase-locked loop, and obtaining grid side voltage instantaneous values $e_d$ and $e_q$ in a dq coordinate system through an abc/dq transformation;

obtaining three-phase inductor current instantaneous values $i_{La}$, $i_{Lb}$ and $i_{Lc}$ by current sampling, obtaining inductor current instantaneous values $i_{Ld}$ and $i_{Lq}$ in the dq coordinate system through the abc/dq transformation; comparing inductor current reference values $i_{Lq}^*$ and $i_{Ld}^*$ in the dq coordinate system obtained after power outer loop PI controller operation with the inductor current instantaneous values $i_{Ld}$ and $i_{Lq}$ in the dq coordinate system, an error value obtained from the comparison being processed by the PI controller operation to obtain an output value, and the output value being added to/subtracted from a feedforward quantity and a decoupling term to obtain output voltage values $u_d$ and $u_q$ in the dq coordinate system, obtaining a voltage component in an αβ coordinate system through a dq/αβ coordinate transformation, generating a space vector pulse width modulation wave, and then generating 12 pulse width modulation wave drive signals to achieve the grid-connected constant power control.

4. The method of claim 2, wherein in the peak-valley arbitrage discharging mode of the second mode, the constant voltage and constant frequency control includes:

a control target of a voltage outer loop being a load side voltage, obtaining three-phase voltage instantaneous values $u_a$, $u_b$, and $u_c$ in an abc coordinate system by voltage sampling, and then obtaining voltage instantaneous values $U_d$ and $U_q$ in a dq coordinate system through an abc/dq transformation, comparing voltage reference values $U_d^*$ and $U_q^*$ in the dq coordinate system with the voltage instantaneous values $U_d$ and $U_q$, determining inductor current reference values $i_{Ld}^*$ and $i_{Lq}^*$ in the dq coordinate system output by the PI controller operation on an error value obtained by the comparison as reference values of a current inner loop; obtaining three-phase inductor current instantaneous values $i_{La}$, $i_{Lb}$, and $i_{Lc}$ in the abc coordinate system by current sampling, and then obtaining current instantaneous values $i_{Ld}$ and $i_{Lq}$ in the dq coordinate system through the abc/dq transformation, the inductor current reference values $i_{Ld}^*$ and $i_{Lq}^*$ in the dq coordinate system being compared with the inductor current instantaneous values $i_{Ld}$ and $i_{Lq}$ to obtain error values, the error values being processed by the PI controller operation to obtain output values, and the output values being added to/subtracted from a voltage feedforward quantity and a load term to obtain output voltage values $u_d$ and $u_q$, obtaining a voltage component in an $\alpha\beta$ coordinate system through a dq/$\alpha\beta$ coordinate transformation, generating a space vector pulse width modulation wave, and then generating 12 pulse width modulation wave drive signals to achieve the constant voltage and constant frequency control.

5. The method of claim 1, wherein the achieving real-time and accurate detection of the voltage sag on a grid side and a load side by adopting an improved variational mode decomposition detection approach based on a Teager-Kaiser energy operator and a kurtosis coefficient includes:

converting a voltage instantaneous value into an envelope by the Teager-Kaiser energy operator to enhance a voltage sag feature, an expression of the Teager-Kaiser energy operator being:

$$\psi[u(t)] = \dot{u}^2(t) - u(t)\ddot{u}(t) = U^2\omega^2 \cos^2(\omega t+\varphi_0) + U^2\omega^2 \sin^2(\omega t+\varphi_0) = U^2\omega^2$$

where $\psi$ represents the Teager-Kaiser energy operator, u(t) represents the voltage instantaneous value, U represents a voltage peak value, w represents a frequency, $\varphi_0$ represents an initial phase, $\dot{u}^2(t)$ represents a square of a first derivative of the voltage instantaneous value u(t), and $\ddot{u}(t)$ represents a second derivative of the voltage instantaneous value u(t);

establishing a variational constraint model, an expression of the variational constraint model being:

$$\begin{cases} \min_{\{u_k\},\{\omega_k\}} \left\{ \sum_{k=1}^{K} \left\| \partial_t \left[ \left(\delta(t) + \frac{j}{\pi t}\right) \times u_k(t) \right] e^{-j\omega_k t} \right\|_2^2 \right\} \\ \text{s.t.} \sum_{k=1}^{K} u_k = f(t) \end{cases}$$

where $u_k$ represents a k-th decomposed intrinsic mode function component, $u_k(t)$ represents a k-th decomposed intrinsic mode function component at time t; K represents a count of decomposed modes, $f(t)$ represents a voltage sag signal, $\delta(t)$ represents an impulse function, $\omega_k$ represents a center frequency of a k-th intrinsic mode function component, $\partial_t$ represents gradient operation, s.t. represents a constraint condition, j represents an imaginary unit, and $\omega_t$ represents a phase angle that changes with the time t;

transforming a constrained variational problem into an unconstrained variational problem by introducing an augmented Lagrangian function L, an expression of the augmented Lagrangian function L being:

$$L = (\{u_k\}, \{\omega_k\}, \{\lambda\}) = \alpha_0 \sum_{k=1}^{K} \left\| \partial_t \left[ \left(\delta(t) + \frac{j}{\pi}\right) \times u_k(t) \right] e^{-j\omega_k t} \right\|_2^2 + \left\| f(t) - \sum_{k=1}^{K} u_k(t) \right\|_2^2 + \left\langle \lambda(t), f(t) - \sum_{k=1}^{K} u_k(t) \right\rangle$$

where $\alpha_0$ represents a penalty factor, $\lambda$ represents a Lagrangian operator, $\langle,\rangle$ represents inner product operation, $\lambda(t)$ represents a Lagrangian operator at the time t, $\|.\|_2^2$ represents a 2-norm, and $\partial_t$ represents the gradient operation;

updating and iterating K intrinsic mode functions and residual components with a fixed bandwidth and a center frequency by using an alternating direction method of multipliers (ADMM), expressions of update equations and iterative termination conditions of the $\{u_k\}$, $\{\omega_k\}$, and $\lambda$ based on Fourier isometric transform being:

$$\hat{u}_k^{n+1} = \frac{\hat{f}(\omega) - \sum_{i\neq k} \hat{u}_i(\omega) + \frac{\hat{\lambda}(\omega)}{2}}{1 + 2\alpha_0(\omega - \omega_k)^2}$$

$$\hat{\omega}_k^{n+1} = \frac{\int_0^\infty \omega |\hat{u}_i(\omega)|^2 d\omega}{\int_0^\infty |\hat{u}_i(\omega)|^2 d\omega}$$

$$\hat{\lambda}^{n+1}(\omega) = \hat{\lambda}^n(\omega) + \tau \left[ \hat{f}(\omega) - \sum_{k=1}^{K} \hat{u}_k^{n+1}(\omega) \right]$$

$$\sum_{k=1}^{K} \frac{\|\hat{u}_k^{n+1} - \hat{u}_k^n\|_2^2}{\|\hat{u}_k^n\|_2^2} < \varepsilon$$

where $\hat{u}_k^{n+1}$ and $\hat{\omega}_k^{n+1}$ represent Fourier transforms of $u_k^{n+1}$ and $\omega_k^{n+1}$, respectively, $\tau$ represents a noise tolerance, $\varepsilon$ represents a convergence accuracy; $u_k^{n+1}$ and $\omega_k^{n+1}$ represent a k-th decomposed intrinsic function component of an (n+1)-th sample and a center frequency of the intrinsic function component, respectively; $\hat{f}(\omega)$, $\hat{u}_i(\omega)$, and $\hat{\lambda}(\omega)$ represent an original signal after the Fourier transform, an i-th decomposed intrinsic function component after the Fourier transform, and the Lagrangian operator after the Fourier transform, respectively; $\hat{\lambda}^n(\omega)$ represents the Lagrangian operator after the Fourier transform of an n-th sample with a center frequency of $\omega$; $\hat{u}_k^{n+1}(\omega)$ represents a Fourier transform of the k-th decomposed intrinsic function component of the (n+1)-th sample with the center frequency of $\omega$; d represents a derivative symbol; $\hat{u}_k^n$ represents the Fourier transform of the k-th decomposed intrinsic function component of the n-th sample;

calculating the kurtosis coefficient $K_C$ of each of the intrinsic mode functions and the residual components, and selecting a component with a maximum $K_C$ as an optimal component, an expression of the kurtosis coefficient $K_C$ being:

$$K_C = \frac{E(x' - \mu)^4}{\sigma^4}$$

where $K_C$ represents the kurtosis coefficient, x' represents a detection signal, E represents an expected value, $\mu$ represents an average value, and $\sigma$ represents a standard deviation;

determining a mutation sampling point in the optimal component based on calculation of a change rate, an expression of the change rate being:

$$y(i) = \frac{x(i) - x(i-1)}{\Delta t}$$

where y represents the change rate, i represents a sampling point, x represents a value of the optimal component, and $\Delta t$ represents a time interval of the sampling point;

calculating a standard deviation of a detection result and an actual result at different starting thresholds $p_i$ and ending thresholds $p_t$ according to measured voltage sag data, and determining a threshold corresponding to a minimum standard deviation as an optimal detection threshold; when $y(i) > p_i$, representing that the voltage sag occurs, and when $y(i) < p_t$, representing that the voltage sag ends;

for a phase a voltage, recording voltage instantaneous values $v_a(t_1)$ and $v_a(t_2)$ at a time $t_1$ when the voltage sag occurs and a time $t_2$ when the voltage sag ends according to the detection result, and an expression of an instantaneous voltage change $\Delta v_a(t)$ being:

$$\Delta v_a(t) = v_a^{ref}(t) - v_a(t)$$

where $v_a^{ref}(t)$ represents a voltage reference value at the time t; $v_a(t)$ represents a voltage instantaneous value of the phase a voltage at the time t;

reconstructing a three-phase voltage instantaneous value into a space vector after the voltage sag occurs, $\vec{v}(t_1)$ and $\vec{v}(t_2)$ representing three-phase voltage space vectors at the time $t_1$ and the time $t_2$, respectively, $n(t_1)$ and $n(t_2)$ representing an angle between the $\vec{v}(t_1)$ and a positive direction of a real axis and an angle between the $\vec{v}(t_2)$ and the positive direction of the real axis, respectively; an initial phase and an termination phase of the voltage sag of the phase a voltage being $m(t_1) = n(t_1) + (\pi/2)$ and $m(t_2) = n(t_2) + (\pi/2)$, respectively; expressions of the $n(t_1)$ and the $n(t_2)$ being:

$$\begin{cases} n(t_1) = \arctan\{\text{Im}\{\vec{v}_a(t_1)\}/\text{Re}[\vec{v}_a(t_1)]\} \\ n(t_2) = \arctan\{\text{Im}\{\vec{v}_a(t_2)\}/\text{Re}[\vec{v}_a(t_2)]\} \end{cases}$$

where Im represents an imaginary part, Re represents a real part; $\vec{v}_a(t_1)$ and $\vec{v}_a(t_2)$ represent the space vectors of the voltage instantaneous values $v_a(t_1)$ and $v_a(t_2)$ at the time $t_1$ when the voltage sag occurs and the time $t_2$ when the voltage sag ends, respectively;

similarly, obtaining a voltage sag feature of a phase b and a phase c, respectively.

6. The method of claim 5, wherein the achieving optimal energy compensation through flexible switching in an input stage and an output stage adopting a flexible optimal energy compensation strategy to prevent SE from tripping due to a phase jump caused by the optimal energy compensation includes:

for a phase a, the flexible optimal energy compensation strategy including:

when the voltage sag occurs, an expression of active power $P_{HESS}$ output by the hybrid energy storage system being:

$$P_{HESS} = [|u_{SE}^{aft}|\cos\varphi - |u_{sag}|\cos\delta]|i_{SE}^{aft}|$$

where $u_{SE}^{aft}$ represents an SE voltage during the voltage sag, $u_{sag}$ represents a grid voltage during the voltage sag, $i_{SE}^{aft}$ represents an SE current during the voltage sag; $\varphi$ represents a power factor angle, $\delta$ represents a phase of the grid voltage $u_{sag}$ and the SE current $i_{SE}^{aft}$ during the voltage sag;

when a shallow voltage sag occurs, $|u_{SE}^{aft}|\cos\varphi \leq |u_{sag}|$, adjusting the phase $\delta$ by a compensation voltage provided by the hybrid energy storage system, so that the compensation voltage $u_{HESS}$ provided by the hybrid energy storage system being perpendicular to the SE current $i_{SE}^{aft}$ during the voltage sag, the active power $P_{HESS}=0$; at this time, the hybrid energy storage system only providing reactive power to achieve the voltage sag control, an expression of the compensation voltage $u_{HESS}$ being:

$$\begin{cases} |u_{HESS}| = |u_{SE}^{bef}|\sin\varphi - |u_{sag}|\sin\delta \\ \alpha = \left(\frac{\pi}{2} - \delta\right) + (\varphi - \theta) \end{cases}$$

where $u_{SE}^{bef}$ represents an SE voltage before the voltage sag, the phase $\delta = \arccos\{[|u_{SE}^{bef}|\cos\varphi/|u_{sag}|]\}$, $\alpha$ represents a phase of the compensation voltage provided by the hybrid energy storage system, and $\theta$ represents a phase jump during the voltage sag;

when a deep voltage sag occurs, $|u_{SE}^{aft}|\cos\varphi > |u_{sag}|$, adjusting the phase $\delta$ by the compensation voltage provided by the hybrid energy storage system, so that the compensation voltage $u_{HESS}$ being in the same phase as the SE current $i_{SE}^{aft}$ during the voltage sag; at this time, the expression of the compensation voltage $u_{HESS}$ being:

$$\begin{cases} |u_{HESS}| = \sqrt{|u_{SE}^{bef}|^2 + |u_{sag}|^2 - 2|u_{SE}^{bef}||u_{sag}|\cos\varphi} \\ \alpha = \frac{\pi}{2} + \arctan\left[\frac{|u_{sag}|\cos(\varphi+\theta) - |u_{SE}^{bef}|\cos(2\varphi+\theta)}{|u_{SE}^{bef}|\sin(2\varphi+\theta) - |u_{sag}|\sin(\varphi+\theta)}\right] \end{cases}$$

in the input stage, the hybrid energy storage system providing the compensation voltage by voltage phase flexible switching to avoid causing a large phase jump;

according to a vector relationship, during the shallow voltage sag and the deep voltage sag, an expression of an amplitude $|u_{HESS}^{in}|$ of the compensation voltage provided by the hybrid energy storage system in the input stage being:

$$|u_{HESS}^{in}| = \sqrt{|u_{SE}^{bef}|^2 + |u_{sag}|^2 - 2|u_{SE}^{bef}||u_{sag}|(\cos\varphi\cos\delta + \sin\varphi\sin\delta)}$$

according to the vector relationship, during the shallow voltage sag and the deep voltage sag, an expression of an initial phase $\alpha_i^{in}$ of the compensation voltage provided by the hybrid energy storage system in the input stage being:

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right] + \pi$$

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right]$$

according to the vector relationship, during the shallow voltage sag and the deep voltage sag, a termination phase $\alpha_t^{in}$ of the compensation voltage provided by the hybrid energy storage system in the input stage being the phase $\alpha$ of the compensation voltage, $\alpha_t^{in}=\alpha$;

in the input stage, the SE undergoing the phase jump $\theta$ before the voltage sag control, if no tripping occurs at this time, indicating that the phase jump tolerated by the SE being $\theta$; flexibly switching the initial phase $\alpha_i^{in}$ of the compensation voltage provided by the hybrid energy storage system and a load voltage maintained in a state $\mu_L^{bef}$ before the voltage sag through an input transition stage $\Delta T^{in}$ to the termination phase $\alpha_t^{in}$ of the compensation voltage provided by the hybrid energy storage system and the state $u_L^{aft}$ of the load voltage of the optimal energy compensation strategy;

according to a phase change in the input stage, an expression of the voltage phase flexible switching being:

$$\alpha^{in} = \alpha_i^{in} + (\alpha_t^{in} - \alpha_i^{in})\frac{(T-T_1)}{\Delta T^{in}} T_1 \leq T \leq T_2$$

where $\alpha^{in}$ represents a phase of the compensation voltage provided by the hybrid energy storage system in the input stage, $T_1$ and $T_2$ represents an initiation time and a termination time of the input stage, respectively; T represents a current time;

an expression of the input transition stage $\Delta T^{in}$ being:

$$\Delta T^{in} = \left\lceil \frac{\gamma}{\theta} \right\rceil \times s_l$$

where $\gamma$ represents the phase jump before and after the voltage sag control of the hybrid energy storage system, when the shallow voltage sag occurs, $\gamma=\varphi-\delta$, when the deep voltage sag occurs, $\gamma=\varphi$; a count of steps is calculated by rounding up $\gamma/\theta$, and the input transition stage is calculated according to a switching step $s_l$;

in the output stage, the hybrid energy storage system providing the compensation voltage by the voltage phase flexible switching to avoid causing the large phase jump;

according to the vector relationship, an expression of the amplitude $|u_{HESS}^{out}|$ of the compensation voltage provided by the hybrid energy storage system in the output stage being:

$$|u_{HESS}^{out}| = 2|u_{SE}^{bef}|\cos\left[\frac{\pi - \xi}{2} + (\alpha_m^{out} - \alpha^{out})\right]$$

where $\xi$ represents a phase jump occurring when the SE recovers from the voltage sag; $\alpha_m^{out}$ represents an intermediate phase of the compensation voltage provided by the hybrid energy storage system in the output stage, and $\alpha^{out}$ represents a phase of the compensation voltage provided by the hybrid energy storage system in the output stage;

according to the vector relationship, expressions of an initial phase $\alpha_i^{out}$, the intermediate phase $\alpha_m^{out}$, and a termination phase $\alpha_t^{out}$ of the compensation voltage provided by the hybrid energy storage system in the output stage being:

$$\begin{cases} \alpha_i^{out} = \alpha_t^{in} \\ \alpha_m^{out} = \pi/2 + (3\varphi)/2 + \theta \\ \alpha_t^{out} = \pi/2 + \varphi \end{cases}$$

in the output stage, the initial phase $\alpha_i^{out}$ of the compensation voltage provided by the hybrid energy storage system being equal to the termination phase $\alpha_t^{in}$ in the input stage; the phase jump $\xi$ occurring when the SE recovers from the voltage sag, if no tripping occurs at this time, indicating that the phase jump tolerated by the SE being $\xi$; instantaneously switching the initial phase $\alpha_i^{out}$ of the compensation voltage provided by the hybrid energy storage system to the intermediate phase $\alpha_m^{out}$, and maintaining the load voltage at the state $u_L^{aft}$ during the voltage sag, the SE still not tripping when the phase jump $\xi$ occurs again; flexibly switching to the termination phase $\alpha_t^{out}$ of the compensation voltage provided by the hybrid energy storage system through the output transition stage $\Delta T^{out}$, and restoring the load voltage to a normal grid voltage $u_g$;

according to the phase change in the output stage, the expression of voltage phase flexible switching being:

$$\alpha^{out} = \alpha_m^{out} - (\alpha_t^{out} - \alpha_m^{out})\frac{(T-T_4)}{\Delta T^{out}} T_4 \leq T \leq T_5$$

where $\alpha^{out}$ represents the phase of the compensation voltage provided by the hybrid energy storage system in the output stage, $T_4$ and $T_5$ represent the intermediate time and the termination time of the output stage, respectively;

the expression of the output transition stage $\Delta T^{out}$ being:

$$\Delta T^{out} = \left\lceil \frac{\eta}{\max(\theta, \xi)} \right\rceil \times s_l$$

where $\eta$ represents the phase jump when the voltage sag recovers, the count of steps is calculated by rounding up $$\frac{\eta}{\max(\theta, \xi)},$$

and the output transition stage is calculated according to the switching step $s_l$;

the flexible optimal energy compensation strategies of the phase b and the phase c being the same as the phase a.

7. The method of claim 2, wherein on a DC/DC side, the on a DC/DC side, coordinating power output through power frequency division control according to a difference in response features between the supercapacitor and the lithium battery energy storage system includes:

performing the power frequency division control on the DC/DC converter in the lithium battery and the supercapacitor, including:

under the voltage sag, an active power demand of the SE being divided into a low-frequency component and a high-frequency component; obtaining an active power demand value $P_{HESS}^{dem}$ by summing a three-phase active power $P_{HESS}$ of the hybrid energy storage system, allocating the active power demand value $p_{HESS}{}^{dem}$ of the lithium battery and the supercapacitor according to the low-frequency component and the high-frequency component through a low-pass filter, i.e., $p_{LB}{}^{dem}$ and $p_{SC}{}^{dem}$;

in the lithium battery, calculating a current reference value $I_{LB}{}^{ref}$ of the lithium battery according to a difference between the active power demand value $P_{LB}{}^{dem}$ of the lithium battery and an active power measurement value $P_{LB}$ of the lithium battery;

in the supercapacitor, calculating a current reference value $I_{SC}{}^{ref}$ of the supercapacitor by adding a difference between the $P_{LB}{}^{dem}$ and the $P_{LB}$ to a difference between the active power demand value $P_{SC}{}^{dem}$ of the supercapacitor and an active power measurement value $P_{SC}$ of the supercapacitor;

calculating a duty ratio of the lithium battery according to a difference between the current reference value $I_{LB}{}^{ref}$ of the lithium battery and a current measurement value $I_{LB}$ of the lithium battery by the current feedback inner loop; calculating a duty ratio of the supercapacitor according to a difference between the current reference value $I_{SC}{}^{ref}$ the supercapacitor and a current measurement value $I_{SC}$ of the supercapacitor, thereby generating a pulse signal by pulse width modulation;

constructing a composite control system including the voltage feedforward loop, the voltage feedback outer loop, and the current feedback inner loop to control the DC/AC converter according to the flexible optimal energy compensation strategy and a reference value $u_{HESS}{}^{ref}$ of the compensation voltage provided by the hybrid energy storage system;

calculating a feedforward voltage reference value $u_F{}^{ref}$ ref of the hybrid energy storage system according to a difference between a reference value $u_{HESS}{}^{ref}$ of the compensation voltage and the compensation voltage $u_{HESS}$ of the hybrid energy storage system by the voltage feedforward loop; calculating the current reference value $i_{SE}{}^{ref}$ of the SE according to the feedforward voltage reference value $u_F{}^{ref}$ by the voltage feedback outer loop; calculating a feedback voltage reference value $U_B{}^{ref}$ of the hybrid energy storage system according to a difference between the $i_{SE}{}^{ref}$ and a current $i_{SE}$ of the SE, and calculating a voltage reference value $U_{SE}{}^{ref}$ of the SE according to the feedforward voltage reference value up ref and the feedback voltage reference value $U_B{}^{ref}$ by the current feedback inner loop;

adding a quasi-resonance controller to a PI controller of voltage feedback and current feedback to achieve static error free tracking of an AC signal and eliminate harmonics of a specific frequency, an expression of a transfer function of the quasi-resonance controller being:

$$G_{QR}(s) = \frac{2\omega_c K_r s}{s^2 + 2\omega_c s + \omega_0^2}$$

where $K_r$ represents a gain of an n-order quasi-resonance controller, $\omega_0$ represents a fundamental frequency, $\omega_c$ represents a resonant frequency bandwidth; and s represents a Laplace operator;

an expression of the transfer function of a proportional integral multi-quasi-resonance controller used to control odd-order harmonics being:

$$G_{PIMQR}(s) = K_p + \frac{K_i}{s} + \sum_{n=3,5,7,9,\ldots} \frac{2\omega_c K_r s}{s^2 + 2\omega_c s + (n\omega_0)^2}$$

where $K_p$ represents a proportional coefficient, and $K_i$ represents an integral coefficient.

8. A system for sensitive equipment (SE) voltage sag control based on flexible multiplexing of an energy storage system, comprising:

a topological structure for a hybrid energy storage system to control a voltage sag, wherein the hybrid energy storage system includes a lithium battery energy storage system and a supercapacitor, controlling of an early stage of the voltage sag is achieved by the supercapacitor, and continuous controlling of a late stage of the voltage sag is achieved by the lithium battery energy storage system;

a detection unit configured to achieve real-time and accurate detection of the voltage sag on a grid side and a load side by adopting an improved variational mode decomposition detection approach based on a Teager-Kaiser energy operator and a kurtosis coefficient;

a compensation unit configured to achieve optimal energy compensation through flexible switching in an input stage and an output stage adopting a flexible optimal energy compensation strategy to prevent SE from tripping due to a phase jump caused by the optimal energy compensation;

a control system configured to:

on a DC/DC side, coordinate power output through power frequency division control according to a difference in response features between the supercapacitor and the lithium battery energy storage system;

on a DC/AC side, perform composite control through a voltage feedforward loop, a voltage feedback outer loop, and a current feedback inner loop, and eliminate a secondary effect of harmonics on the SE using a proportional integral quasi-resonance controller.

9. The system of claim 8, wherein the hybrid energy storage system includes a lithium battery; the supercapacitor is connected in series with a switch S and then connected in parallel with the lithium battery;

the hybrid energy storage system is connected in parallel with a power grid to achieve peak-valley arbitrage, and is connected to the power grid via a DC/AC converter, an LC filter, and a thyristor in sequence;

the hybrid energy storage system is connected in series with the SE for voltage sag control, and is connected to a load R via a DC bus, a DC/AC inverter, the LC filter, and a transformer in sequence by coupling; wherein the topological structure includes four operation modes:

a first mode is a peak-valley arbitrage charging mode: during a period of low electricity price, the thyristor is turned on and the switch S is closed, the load R is in a grid-connected operation state, and a grid voltage $U_{grid}$ supplies power to the load R; the lithium battery and the supercapacitor are charged by the power grid using grid-connected constant power control; when charging is completed, the grid-connected constant power control stops outputting a pulse signal to the DC/AC inverter, and the hybrid energy storage system is in a standby state with full power;

a second mode is a peak-valley arbitrage discharging mode: during a period of high electricity price, the thyristor is turned off and the switch S is disconnected, the load R is in an islanded operation state, and the load R is powered by the lithium battery using constant voltage and constant frequency control; when discharging is completed, the thyristor is turned on, and the load resumes the grid-connected operation state, the load R is powered by the power grid; the hybrid energy storage system is in the standby state with surplus power, waiting for the period of low electricity price to start charging;

a third mode is an early stage mode of the voltage sag control: when the voltage sag occurs, the grid voltage and the hybrid energy storage system jointly supply power to the load R; the switch S is closed, and the supercapacitor and the lithium battery supply power simultaneously; the supercapacitor outputs a power exceeding a specific value within a set time threshold to achieve the voltage sag control; and the power of the supercapacitor decreases as an output power of the lithium battery increases;

a fourth mode is a late stage mode of the voltage sag control: as the output power of the lithium battery increases, when the output power of the lithium battery reaches a compensation power required by the load R, the output power of the supercapacitor is 0, the switch S is disconnected, and the load R is powered by the power grid and the lithium battery simultaneously.

10. The system of claim 9, wherein in the peak-valley arbitrage charging mode of the first mode, the grid-connected constant power control includes:

obtaining grid side voltage instantaneous values $e_a$, $e_b$, and $e_c$ by voltage sampling, obtaining a voltage phase $\theta_1$ through a phase-locked loop, and obtaining grid side voltage instantaneous values $e_d$ and $e_q$ in a dq coordinate system through an abc/dq transformation;

obtaining three-phase inductor current instantaneous values $i_{La}$, $i_{Lb}$ and $i_{Lc}$ by current sampling, obtaining inductor current instantaneous values $i_{Ld}$ and $i_{Lq}$ in the dq coordinate system through the abc/dq transformation; comparing inductor current reference values $i_{Lq}^*$ and $i_{Ld}^*$ in the dq coordinate system obtained after power outer loop PI controller operation with the inductor current instantaneous values $i_{Ld}$ and $i_{Lq}$ in the dq coordinate system, an error value obtained from the comparison being processed by the PI controller operation to obtain an output value, and the output value being added to/subtracted from a feedforward quantity and a decoupling term to obtain output voltage values $u_d$ and $u_q$ in the dq coordinate system, obtaining a voltage component in an αβ coordinate system through a dq/αβ coordinate transformation, generating a space vector pulse width modulation wave, and then generating 12 pulse width modulation wave drive signals to achieve the grid-connected constant power control.

11. The of claim 9, wherein in the peak-valley arbitrage discharging mode of the second mode, the constant voltage and constant frequency control includes:

a control target of a voltage outer loop being a load side voltage, obtaining three-phase voltage instantaneous values $u_a$, $u_b$, and $u_c$ in an abc coordinate system by voltage sampling, and then obtaining voltage instantaneous values $U_d$ and $U_q$ in a dq coordinate system through an abc/dq transformation, comparing voltage reference values $U_d^*$ and $U_q^*$ in the dq coordinate system with the voltage instantaneous values $U_d$ and $U_q$, determining inductor current reference values $i_{Ld}^*$ and $i_{Lq}^*$ in the dq coordinate system output by the PI controller operation on an error value obtained by the comparison as reference values of a current inner loop; obtaining three-phase inductor current instantaneous values $i_{Ld}$, $i_{Lb}$, and $i_{Lc}$ in the abc coordinate system by current sampling, and then obtaining current instantaneous values $i_{Ld}$ and $i_{Lq}$ in the dq coordinate system through the abc/dq transformation, the inductor current reference values $i_{Ld}^*$ and $i_{Lq}^*$ in the dq coordinate system being compared with the inductor current instantaneous values $i_{Ld}$ and $i_{Lq}$ to obtain resulting error values, the error values being processed by the PI controller operation to obtain output values, and the output values being added to/subtracted from a voltage feedforward quantity and a load term to obtain output voltage values $u_d$ and $u_q$, obtaining a voltage component in an αβ coordinate system through a dq/αα coordinate transformation, generating a space vector pulse width modulation wave, and then generating 12 pulse width modulation wave drive signals to achieve the constant voltage and constant frequency control.

12. The system of claim 8, wherein the detection unit being configured to achieve real-time and accurate detection of the voltage sag on a grid side and a load side includes:

converting a voltage instantaneous value into an envelope by the Teager-Kaiser energy operator to enhance a voltage sag feature, an expression of the Teager-Kaiser energy operator being:

$$\psi[u(t)] = \dot{u}^2(t) - u(t)\ddot{u}(t) = U^2\omega^2\cos^2(\omega t + \varphi_0) + U^2\omega^2\sin^2(\omega t + \varphi_0) = U^2\omega^2$$

where $\psi$ represents the Teager-Kaiser energy operator, u(t) represents the voltage instantaneous value, U represents a voltage peak value, ω represents a frequency, $\varphi_0$ represents an initial phase, $\dot{u}^2(t)$ represents a square of a first derivative of the voltage instantaneous value u(t), and ü(t) represents a second derivative of the voltage instantaneous value u(t);

establishing a variational constraint model, an expression of the variational constraint model being:

$$\begin{cases} \min_{\{u_k\},\{\omega_k\}} \left\{ \sum_{k=1}^{K} \left\| \partial_t \left[ \left( \delta(t) + \frac{j}{\pi t} \right) \times u_k(t) \right] e^{-j\omega_t t} \right\|_2^2 \right\} \\ \text{s.t.} \sum_{k=1}^{K} u_k = f(t) \end{cases}$$

where $u_k$ represents a k-th decomposed intrinsic mode function component, $u_k(t)$ represents a k-th decomposed intrinsic mode function component at time t; K represents a count of decomposed modes, $f(t)$ represents a voltage sag signal, δ(t) represents an impulse function, $\omega_k$ represents a center frequency of a k-th intrinsic mode function component, $\partial_t$ represents gradient operation, s.t. represents a constraint condition, j represents an imaginary unit, and $\omega_t$ represents a phase angle that changes with the time t;

transforming a constrained variational problem into an unconstrained variational problem by introducing an augmented Lagrangian function L, an expression of the augmented Lagrangian function L being:

$$L = (\{u_k\}, \{\omega_k\}, \{\lambda\}) = \alpha_0 \sum\nolimits_{k=1}^{K} \left\| \partial_t \left[ \left( \delta(t) + \frac{j}{\pi} \right) \times u_k(t) \right] e^{-j\omega_t t} \right\|_2^2 +$$

$$\left\| f(t) - \sum\nolimits_{k=1}^{K} u_k(t) \right\|_2^2 + \left\langle \lambda(t), f(t) - \sum\nolimits_{k=1}^{K} u_k(t) \right\rangle$$

where $\alpha_0$ represents a penalty factor, $\lambda$ represents a Lagrangian operator, <,> represents inner product operation, $\lambda(t)$ represents a Lagrangian operator at the time t, $\|.\|_2^2$ represents a 2-norm, and $\partial_t$ represents the gradient operation;

updating and iterating K intrinsic mode functions and residual components with a fixed bandwidth and a center frequency by using an alternating direction method of multipliers (ADMM), expressions of update equations and iterative termination conditions of the $\{u_k\}$, $\{\omega_k\}$, and $\lambda$ based on Fourier isometric transform being:

$$\hat{u}_k^{n+1} = \frac{\hat{f}(\omega) - \sum_{i \neq k} \hat{u}_i(\omega) + \frac{\hat{\lambda}(\omega)}{2}}{1 + 2\alpha_0(\omega - \omega_k)^2}$$

$$\hat{\omega}_k^{n+1} = \frac{\int_0^\infty \omega |\hat{u}_i(\omega)|^2 d\omega}{\int_0^\infty |\hat{u}_i(\omega)|^2 d\omega}$$

$$\hat{\lambda}^{n+1}(\omega) = \hat{\lambda}^n(\omega) + \tau \left[ \hat{f}(\omega) - \sum_{k=1}^{K} \hat{u}_k^{n+1}(\omega) \right]$$

$$\sum_{k=1}^{K} \frac{\|\hat{u}_k^{n+1} - \hat{u}_k^n\|_2^2}{\|\hat{u}_k^n\|_2^2} < \varepsilon$$

where $\hat{u}_k^{n+1}$ and $\hat{\omega}_k^{n+1}$ represent Fourier transforms of $u_k^{n+1}$ and $\omega_k^{n+1}$ respectively, $\tau$ represents a noise tolerance, $\varepsilon$ represents a convergence accuracy; $u_k^{n+1}$ and $\omega_k^{n+1}$ represent a k-th decomposed intrinsic function component of an (n+1)-th sample and a center frequency of the intrinsic function component, respectively; $\hat{f}(\omega)$, $\hat{u}_i(\omega)$, and $\hat{\lambda}(\omega)$ represent an original signal after the Fourier transform, an i-th decomposed intrinsic function component after the Fourier transform, and the Lagrangian operator after the Fourier transform, respectively; $\hat{\lambda}^n(\omega)$ represents the Lagrangian operator after the Fourier transform of an n-th sample with a center frequency of $\omega$; $\hat{u}_k^{n+1}(\omega)$ represents a Fourier transform of the k-th decomposed intrinsic function component of the (n+1)-th sample with the center frequency of $\omega$; d represents a derivative symbol; $\hat{u}_k^n$ represents the Fourier transform of the k-th decomposed intrinsic function component of the n-th sample;

calculating the kurtosis coefficient $K_C$ of each of the intrinsic mode functions and the residual components, and selecting a component with a maximum $K_C$ as an optimal component, an expression of the kurtosis coefficient $K_C$ being:

$$K_C = \frac{E(x' - \mu)^4}{\sigma^4}$$

where $K_C$ represents the kurtosis coefficient, x' represents a detection signal, E represents an expected value, $\mu$ represents an average value, and $\sigma$ represents a standard deviation;

determining a mutation sampling point in the optimal component based on calculation of a change rate, an expression of the change rate being:

$$y(i) = \frac{x(i) - x(i-1)}{\Delta t}$$

where y represents the change rate, i represents a sampling point, x represents a value of the optimal component, and $\Delta t$ represents a time interval of the sampling point;

calculating a standard deviation of a detection result and an actual result at different starting thresholds $p_i$ and ending thresholds $p_t$ according to measured voltage sag data, and determining a threshold corresponding to a minimum standard deviation as an optimal detection threshold; when $y(i) > p_i$, representing that the voltage sag occurs, and when $y(i) < p_t$, representing that the voltage sag ends;

for a phase $\alpha$ voltage, recording voltage instantaneous values $v_a(t_1)$ and $v_a(t_2)$ at a time $t_1$ when the voltage sag occurs and a time $t_2$ when the voltage sag ends according to the detection result, and an expression of an instantaneous voltage change $\Delta v_a(t)$ being:

$$\Delta v_a(t) = v_a^{ref}(t) - v_a(t)$$

where $v_a^{ref}(t)$ represents a voltage reference value at the time t; $v_a(t)$ represents a voltage instantaneous value of the phase a voltage at the time t;

reconstructing a three-phase voltage instantaneous value into a space vector after the voltage sag occurs, $\vec{v}(t_1)$ and $\vec{v}(t_2)$ representing three-phase voltage space vectors at the time $t_1$ and the time $t_2$, $n(t_1)$ and $n(t_2)$ representing an angle between the $\vec{v}(t_1)$ and a positive direction of a real axis and between the $\vec{v}(t_2)$ and the positive direction of the real axis, respectively; an initial phase and an termination phase of the voltage sag of the phase a voltage being $m(t_1) = n(t_1) + (\pi/2)$ and $m(t_2) = n(t_2) + (\pi/2)$, respectively; expressions of the $n(t_1)$ and the $n(t_2)$ being respectively:

$$\begin{cases} n(t_1) = \arctan\{\text{Im}[\vec{v}_a(t_1)]/\text{Re}[\vec{v}_a(t_1)]\} \\ n(t_2) = \arctan\{\text{Im}[\vec{v}_a(t_2)]/\text{Re}[\vec{v}_a(t_2)]\} \end{cases}$$

where Im represents an imaginary part, Re represents a real part; $\vec{v}_a(t_1)$ and $\vec{v}_a(t_2)$ represent the space vectors of the voltage instantaneous values $v_a(t_1)$ and $v_a(t_2)$ at the time $t_1$ when the voltage sag occurs and the time $t_2$ when the voltage sag ends, respectively;

similarly, obtaining a voltage sag feature of a phase b and a phase c, respectively.

13. The system of claim 12, wherein the compensation unit being configured to achieve optimal energy compensation includes:

for a phase a, the flexible optimal energy compensation strategy including:

when the voltage sag occurs, an expression of active power output by the hybrid energy storage system $P_{HESS}$ being:

$$P_{HESS} = \left[\left[|u_{SE}^{aft}|\cos\varphi - |u_{sag}|\cos\delta\right]|i_{SE}^{aft}|\right]$$

where $u_{SE}^{aft}$ represents an SE voltage during the voltage sag, $u_{sag}$ represents a grid voltage during the voltage sag, $i_{SE}^{aft}$ represents an SE current during the voltage sag; $\varphi$ represents a power factor angle, $\delta$ represents a phase of the grid voltage $u_{sag}$ and the SE current $i_{SE}^{aft}$ during the voltage sag;

when a shallow voltage sag occurs, $|u_{SE}^{aft}|\cos\varphi \leq |u_{sag}|$, adjusting the phase $\delta$ by a compensation voltage provided by the hybrid energy storage system, so that the compensation voltage $u_{HESS}$ provided by the hybrid energy storage system being perpendicular to the SE current $i_{SE}^{aft}$ during the voltage sag, the active power $P_{HESS}=0$; at this time, the hybrid energy storage system only providing reactive power to achieve the voltage sag control, an expression of the compensation voltage $u_{HESS}$ being:

$$\begin{cases} |u_{HESS}| = |u_{SE}^{bef}|\sin\varphi - |u_{sag}|\sin\delta \\ \alpha = \left(\frac{\pi}{2} - \delta\right) + (\varphi - \theta) \end{cases}$$

where $u_{SE}^{bef}$ represents an SE voltage before the voltage sag, the phase $\delta = \arccos\{[|u_{SE}^{bef}|\cos\varphi/|u_{sag}|]\}$, $\alpha$ represents a phase of the compensation voltage provided by the hybrid energy storage system, $\theta$ represents a phase jump during the voltage sag;

when a deep voltage sag occurs, $|u_{SE}^{aft}|\cos\varphi > |u_{sag}|$, adjusting the phase $\delta$ by the compensation voltage provided by the hybrid energy storage system, so that the compensation voltage $u_{HESS}$ being in the same phase as the SE current $i_{SE}^{aft}$ during the voltage sag; at this time, the expression of the compensation voltage $u_{HESS}$ being:

$$\begin{cases} |u_{HESS}| = \sqrt{|u_{SE}^{bef}|^2 + |u_{sag}|^2 - 2|u_{SE}^{bef}||u_{sag}|\cos\phi} \\ \alpha = \frac{\pi}{2} + \arctan\left[\frac{|u_{sag}|\cos(\varphi+\theta) - |u_{SE}^{bef}|\cos(2\varphi+\theta)}{|u_{SE}^{bef}|\sin(2\varphi+\theta) - |u_{sag}|\sin(\varphi+\theta)}\right] \end{cases}$$

in the input stage, the hybrid energy storage system providing the compensation voltage by voltage phase flexible switching to avoid causing a large phase jump;

according to a vector relationship, during the shallow voltage sag and the deep voltage sag, an expression of an amplitude $|u_{HESS}^{in}|$ of the compensation voltage provided by the hybrid energy storage system in the input stage being:

$$|u_{HESS}^{in}| = |u_{SE}^{bef}|^2 + |u_{sag}|^2 - 2|u_{SE}^{bef}||u_{sag}|(\cos\varphi\cos\delta + \sin\varphi\sin\delta)$$

according to the vector relationship, during the shallow voltage sag and the deep voltage sag, an expression of an initial phase $\alpha_i^{in}$ of the compensation voltage provided by the hybrid energy storage system in the input stage being:

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right] + \pi$$

$$\alpha_i^{in} = \arctan\left[\frac{|u_{SE}^{bef}|\sin(\varphi) - |u_{sag}|\sin(\varphi+\theta)}{|u_{SE}^{bef}|\cos(\varphi) - |u_{sag}|\cos(\varphi+\theta)}\right]$$

according to the vector relationship, during the shallow voltage sag and the deep voltage sag, a termination phase $\alpha_t^{in}$ of the compensation voltage provided by the hybrid energy storage system in the input stage being the phase $\alpha$ of the compensation voltage, $\alpha_t^{in}=\alpha$;

in the input stage, the SE undergoing the phase jump $\theta$ before the voltage sag, if no tripping occurs at this time, indicating that the phase jump tolerated by the SE being $\theta$; flexibly switching the initial phase $\alpha_i^{in}$ of the compensation voltage provided by the hybrid energy storage system and a load voltage maintained in a state $u_L^{bef}$ before the voltage sag through an input transition stage $\Delta T^{in}$ to the termination phase $\alpha_t^{in}$ of the compensation voltage provided by the hybrid energy storage system and the state $u_L^{aft}$ of the load voltage of the optimal energy compensation strategy;

according to a phase change in the input stage, an expression of the voltage phase flexible switching being:

$$\alpha^{in} = \alpha_i^{in} + (\alpha_t^{in} - \alpha_i^{in})\frac{(T-T_1)}{\Delta T^{in}} T_1 \leq T \leq T_2$$

where $\alpha^{in}$ represents a phase of the compensation voltage provided by the hybrid energy storage system in the input stage, $T_1$ and $T_2$ represents an initiation time and a termination time of the input stage, respectively; T represents a current time;

an expression of the input transition stage $\Delta T^{in}$ being:

$$\Delta T^{in} = \left\lceil \frac{\gamma}{\theta} \right\rceil \times s_l$$

where $\gamma$ represents the phase jump before and after the voltage sag control of the hybrid energy storage system, when the shallow voltage sag occurs, $\gamma=\varphi-\delta$, when the deep voltage sag occurs, $\gamma=\varphi$; a count of steps is calculated by rounding up $\gamma/\theta$, and the input transition stage is calculated according to a switching step st;

in the output stage, the hybrid energy storage system providing the compensation voltage by the voltage phase flexible switching to avoid causing the large phase jump;

according to the vector relationship, an expression of the amplitude $|u_{HESS}^{out}|$ of the compensation voltage provided by the hybrid energy storage system in the output stage being:

$$|u_{HESS}^{out}| = 2|u_{SE}^{bef}|\cos\left[\frac{\pi-\xi}{2} + (\alpha_m^{out} - \alpha^{out})\right]$$

where $\xi$ represents a phase jump occurring when the SE recovers from the voltage sag; $\alpha_m^{out}$ represents an intermediate phase of the compensation voltage provided by the hybrid energy storage system in the output stage, and $\alpha^{out}$ represents a phase of the compensation voltage provided by the hybrid energy storage system in the output stage;

according to the vector relationship, expressions of an initial phase $\alpha_i^{out}$, the intermediate phase $\alpha_m^{out}$, and a termination phase $\alpha_t^{out}$ of the compensation voltage provided by the hybrid energy storage system in the output stage being:

$$\begin{cases} \alpha_i^{out} = \alpha_t^{in} \\ \alpha_m^{out} = \pi/2 + (3\varphi)/2 + \theta \\ \alpha_t^{out} = \pi/2 + \varphi \end{cases}$$

in the output stage, the initial phase $\alpha_i^{out}$ of the compensation voltage provided by the hybrid energy storage system being equal to the termination phase $\alpha_t^{in}$ in the input stage; the phase jump $\xi$ occurring when the SE recovers from the voltage sag, if no tripping occurs at this time, indicating that the phase jump tolerated by the SE being $\tilde{\xi}$; instantaneously switching the initial phase $\alpha_i^{out}$ of the compensation voltage provided by the hybrid energy storage system to the intermediate phase $\alpha_m^{out}$, and maintaining the load voltage at the phase state $u_L^{aft}$ during the voltage sag, the SE still not tripping when the phase jump $\xi$ occurs again; flexibly switching to the termination phase $\alpha_t^{out}$ of the compensation voltage provided by the hybrid energy storage system through the output transition stage $\Delta T^{out}$, and restoring the load voltage to a normal grid voltage $u_g$;

according to the phase change in the output stage, the expression of voltage phase flexible switching being:

$$\alpha^{out} = \alpha_m^{out} - (\alpha_t^{out} - \alpha_m^{out}) \frac{(T - T_4)}{\Delta T^{out}} T_4 \le T \le T_5$$

where $\alpha^{out}$ represents the phase of the compensation voltage provided by the hybrid energy storage system in the output stage, $T_4$ and $T_5$ represent the intermediate time and the termination time of the output stage, respectively;

the expression of the output transition stage $\Delta T^{out}$ being:

$$\Delta T^{out} = \left\lceil \frac{\eta}{\max(\theta, \xi)} \right\rceil \times s_l$$

where $\eta$ represents the phase jump when the voltage sag recovers, the count of steps is calculated by rounding up $$\frac{\eta}{\max(\theta, \xi)},$$

and the output transition stage is calculated according to the switching step $s_l$;

the flexible optimal energy compensation strategies of the phase b and the phase c being the same as the phase a.

14. The system of claim 9, wherein the control system performing power frequency division control on the DC/DC converter in the lithium battery and the supercapacitor, includes:

under the voltage sag, an active power demand of the SE being divided into a low-frequency component and a high-frequency component; obtaining an active power demand value $p_{HESS}^{dem}$ by summing a three-phase active power $P_{HESS}$ of the hybrid energy storage system, allocating the active power demand value $P_{HESS}^{dem}$ of the lithium battery and the supercapacitor according to the low-frequency component and the high-frequency component through a low-pass filter, i.e., $P_{LB}^{dem}$ and $P_{SC}^{dem}$;

in the lithium battery, calculating a current reference value $I_{LB}^{ref}$ of the lithium battery according to a difference between the active power demand value $P_{LB}^{dem}$ of the lithium battery and an active power measurement value $P_{LB}$ of the lithium battery;

in the supercapacitor, calculating a current reference value $I_{SC}^{ref}$ of the supercapacitor by adding a difference between the $P_{LB}^{dem}$ and the $P_{LB}$ to a difference between the active power demand value $P_{SC}^{dem}$ of the supercapacitor and an active power measurement value $P_{SC}$ of the supercapacitor;

calculating a duty ratio of the lithium battery according to a difference between the current reference value $I_{LB}^{ref}$ of the lithium battery and a current measurement value $I_{LB}$ of the lithium battery by the current feedback inner loop; calculating a duty ratio of the supercapacitor according to a difference between the current reference value $I_{SC}^{ref}$ of the supercapacitor and a current measurement value $I_{SC}$ of the supercapacitor, thereby generating a pulse signal by pulse width modulation;

constructing a composite control system including the voltage feedforward loop, the voltage feedback outer loop, and the current feedback inner loop to control the DC/AC converter according to the flexible optimal energy compensation strategy and a reference value $u_{HESS}^{ref}$ of the compensation voltage provided by the hybrid energy storage system;

calculating a feedforward voltage reference value $u_F^{ref}$ of the hybrid energy storage system according to a difference between a reference value $u_{HESS}^{ref}$ of the compensation voltage and the compensation voltage $u_{HESS}$ of the hybrid energy storage system by the voltage feedforward loop; calculating the current reference value $i_{SE}^{ref}$ of the SE according to the feedforward voltage reference value $u_F^{ref}$ by the voltage feedback outer loop; calculating a feedback voltage reference value $u_B^{ref}$ of the hybrid energy storage system according to a difference between the $i_{SE}^{ref}$ and a current $i_{SE}$ of the SE, and calculating a voltage reference value $U_{SE}^{ref}$ of the SE according to the feedforward voltage reference value $u_F^{ref}$ and the feedback voltage reference value ref by the current feedback inner loop;

adding a quasi-resonance controller to a PI controller of voltage feedback and current feedback to achieve static error free tracking of an AC signal and eliminate harmonics of a specific frequency, an expression of a transfer function of the quasi-resonance controller being:

$$G_{QR}(s) = \frac{2\omega_c K_r s}{s^2 + 2\omega_c s + \omega_0^2}$$

where $K_r$ represents a gain of an n-order quasi-resonance controller, $\omega_0$ represents a fundamental frequency, $\omega_c$ represents a resonance frequency bandwidth; and s represents a Laplace operator;

an expression of the transfer function of a proportional integral multi-quasi-resonance controller used to control odd-order harmonics being:

$$G_{PIMQR}(s) = K_p + \frac{K_i}{s} + \sum_{n=3,5,7,9,\ldots} \frac{2\omega_c K_r s}{s^2 + 2\omega_c s + (n\omega_0)^2}$$

where $K_p$ represents a proportional coefficient, and $K_i$ represents an integral coefficient.

* * * * *